United States Patent
Adachi et al.

(10) Patent No.: US 7,362,947 B2
(45) Date of Patent: Apr. 22, 2008

(54) DEVICE, METHOD, AND SYSTEM FOR VIDEO EDITING, AND COMPUTER READABLE RECORDING MEDIUM HAVING VIDEO EDITING PROGRAM RECORDED THEREON

(75) Inventors: Hiroaki Adachi, Kanagawa (JP); Katsuakira Moriwake, Tokyo (JP); Takeshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1070 days.

(21) Appl. No.: 09/828,407

(22) Filed: Apr. 6, 2001

(65) Prior Publication Data
US 2001/0053275 A1 Dec. 20, 2001

(30) Foreign Application Priority Data
Apr. 7, 2000 (JP) ............................. 2000-106840

(51) Int. Cl.
*H04N 5/93* (2006.01)
(52) U.S. Cl. ............................. 386/52; 386/4; 386/53; 386/55; 386/64; 386/61; 386/62
(58) Field of Classification Search .................. 386/52, 386/4, 53, 55, 64, 61–62
See application file for complete search history.

(56) References Cited

U.S. PATENT DOCUMENTS

| | | | | |
|---|---|---|---|---|
| 6,154,600 A * | 11/2000 | Newman et al. | ............... | 386/4 |
| 6,535,252 B1 * | 3/2003 | Bruls | ........................ | 348/459 |
| 6,674,955 B2 * | 1/2004 | Matsui et al. | ................. | 386/52 |
| 6,778,223 B2 * | 8/2004 | Abe | ........................... | 348/559 |
| 2001/0022893 A1 * | 9/2001 | Sanders | ...................... | 386/112 |

\* cited by examiner

*Primary Examiner*—Thai Q. Tran
*Assistant Examiner*—Helen Shibru
(74) *Attorney, Agent, or Firm*—Frommer Lawrence & Haug LLP; William S. Frommer; Thomas F. Presson

(57) ABSTRACT

A variety of special effect processing is performed on video frames retrieved from a disk device 30 in effect processing stages ES1, ES2, and so on. A work memory 112B is always interposed between processing at one stage and processing at the next stage. Further, a plurality of processing are performed in parallel at one effect processing stage. Frames having all of effect processing completed are stored in an input/output buffer 115 in no special order through layering processing ESL. The plurality of edited frames stored in the input/output buffer 115 are output in synchronization with an output clock (not shown) in realtime.

16 Claims, 13 Drawing Sheets

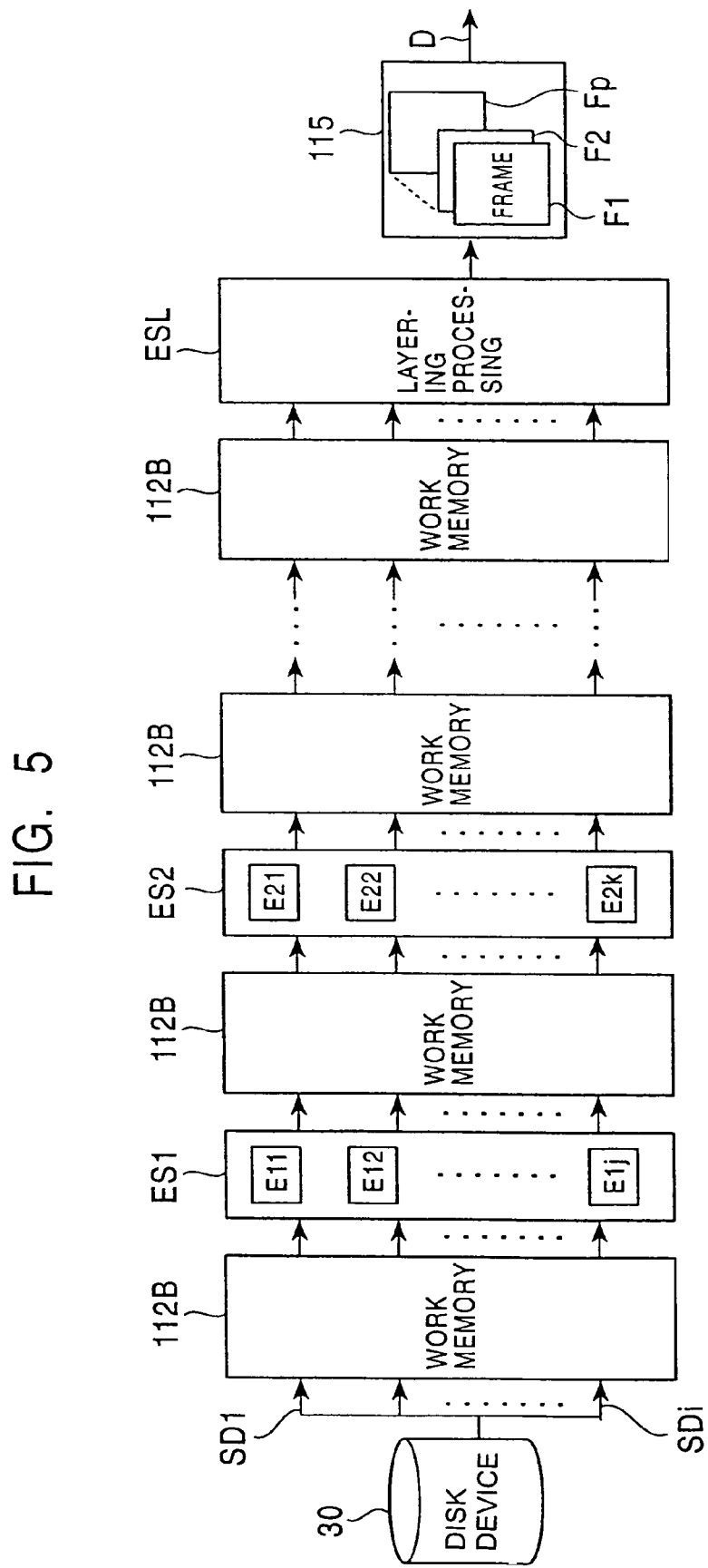

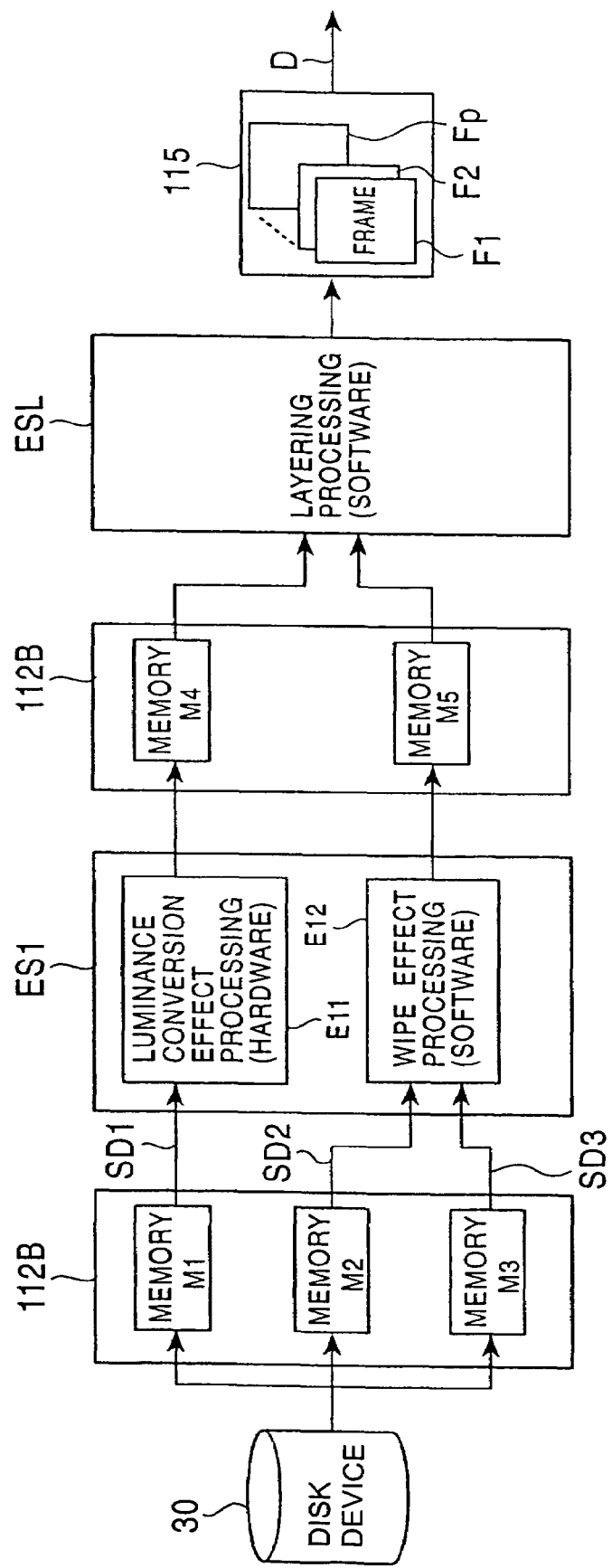

US 7,362,947 B2

DEVICE, METHOD, AND SYSTEM FOR VIDEO EDITING, AND COMPUTER READABLE RECORDING MEDIUM HAVING VIDEO EDITING PROGRAM RECORDED THEREON

BACKGROUND OF THE INVENTION

1. Field of the Invention

The present invention relates to a device, a method, and a system for non-linear editing of video, and to a computer-readable recording medium on which a program for video editing is recorded.

2. Description of the Related Art

Conventionally, video editing work has been performed by using an editing device called a non-linear editor. The non-linear editor can copy video and/or audio data (called "material" below) which has been recorded on an original tape onto a random-access recordable and readable disk-type recording medium (simply called a "disk" below), such as a hard disk, once, and can then read out a plurality of materials recorded on the disk in a user-defined time interval. Then, it can perform a variety of image special effects (called "effects" below) on these materials for output on a monitor or a tape. According to this device, quick access can be made to each editing point (cut), which reduces the time required for the editing work compared to linear editing in which editing is performed directly on the tape.

In the non-linear editor, important factors for performance evaluation are how fast a series of the above-described editing operations can be performed than that for real-time processing, or among types of effect processing that are complicated and cannot be performed in real time, how rapidly rendering processing can be performed. Here, rendering processing refers to processing that converts image signals for creating an image to be displayed and whose result is written on a recording medium.

In the conventional non-linear editor, it is common for internal processing to use a processing method called streaming processing or a processing method called frame-by frame processing.

The streaming processing method is a form of processing used in an editor mainly utilizing hardware. It buffers material retrieved from a disk asynchronously and a plurality of types of pipe-lined effect processing is performed thereon mutually and simultaneously. It should be noted that the asynchronous processing refers to processing for reading data in advance before outputting the data, while synchronous processing refers to processing performed by following time (that is, synchronously) along the flow (movement) of output data. In "pipelined" types of processing, individual types of processing overlap in time at each stage in a plurality of functional units (stages) formed by coupling stages in series so that predetermined types of processing are performed, respectively. That is, a so-called multi-task (parallel) method is applied in order to attempt to reduce the overall processing time.

FIG. 17 shows an overview of the streaming processing method while FIG. 18 shows a timing relationship when each video frame is processed at each stage. The term "video frame" refers to one static image that is a basic unit forming image data. It is simply called a "frame" below. In FIG. 18, (A) shows a time axis, where the length of one frame T in a normal video playback condition is a basic unit, (B) shows the output from a disk 201, (C) shows the output from a buffer 202, (D) shows the output form an effect module 203, and (E) shows the output from an effect module 204. In (B) through (E), one frame is shown in each of F1 to F5. Here, it is assumed that the operating speed of the disk 201 is slower than those of the other resources (effect modules 203 and 204).

In the streaming processing method, as shown in FIG. 17 and FIG. 18, parts (B) and (C), material pre-read from the disk 201 for several frames is stored in the buffer 202, and then the frames are output sequentially in realtime. Further, as shown in FIG. 17 and FIG. 18, parts (D) and (E), each type of corresponding effect processing is performed by the effect modules 203 and 204 on material (each frame) sequentially output from the buffer 202. Here, neither type of effect processing performed by the effect modules 203 and 204 is complicated. Rather, if those types of processing are simple (light) enough for maintaining the real-time characteristic, effect processes which are synchronous with output data 205 to an external device (such as monitor and tape) are possible.

On the other hand, the frame-by-frame processing method is used in an editor mainly utilizing software and is a one-frame-completed type processing method.

FIG. 19 shows an overview of the frame-by-frame processing method while FIG. 20 shows a timing relationship when each video frame is processed at each step in the method. In FIG. 20, (A) shows the time axis, where one frame length in a normal video playback condition is a basic unit, (B) shows the output from a disk 211, (C) shows the output from an effect module 213, (D) shows the output from an effect module 214, and (E) shows the output from a memory 212. In (B) through (E), one frame is shown in each of F1 and F2. Here, it is assumed that the operating speed of the disk 211 is slower than those of the other resources (effect modules 213 and 214).

In the frame-by-frame processing method, as shown in FIGS. 19 and 20, a series of processing on one frame is completed before starting a series of processing performed on the next frame. More specifically, as shown in (B) to (E) in FIG. 20, each type of effect processing is performed by the effect modules 213 and 214 on a frame F1 read out from the disk 211. Once the final result (processed frame) is written in the memory 212, the processed frame) is output from the memory 212. Then, a next frame F2 is read out from the disk 211, and each types of effect processing is performed on the frame F2 by the effect modules 213 and 214 in the same manner as above. Once the processed frame, that is the final result, is written in the memory 212, the processed frame is output from the memory 212. Thereafter, similar types of processing follow.

The streaming processing utilizes hardware, which permits rapid processing. Particularly, as long as the steps in the effect processing are not very complicated, processing close to real-time processing is possible. For example, in FIG. 18, the time required for processing one frame is $\tau 1/5$, which allows the reduction of processing time where a time required for all types of processing on five frames F1 to F5 is $\tau 1$.

On the other hand, the streaming processing has the following problems:

(a) Since it is performed by hardware, a change cannot be handled in a flexible manner when the video signal format, such as size and/or aspect ratio (the ratio of length to width) of an image, is changed. In other words, different hardware must be prepared for each video signal format in order to handle a plurality of different video signal formats;

(b) Since a hardware module performing each effect is essentially fixed, it is not possible to use a part of the processing in order to perform another type of effect processing or to exchange the order of a plurality of types of processing when one effect includes the plurality of types of processing; and (c) In general, the streaming processing method is not compatible with rendering by software. The reason is as follows: In general, hardware processing causes a delay during a period from the time when a type of processing is requested to the time when the processing is actually performed while the period for which the processing is actually performed is significantly shorter than that of software processing. On the other hand, while the software processing is flexible and has a higher precision, the processing time is longer than that of hardware processing. Therefore, in the streaming processing, in order to permit the mixture of hardware processing and software processing, it is necessary to perform several forms of hardware processing continuously for higher efficiency. That is, in a system using the streaming processing method, it is necessary, in consideration of both hardware processing and software processing, to prepare routines (paths) which are suitable for each type of processing. Thus, it is not easy to incorporate rendering software, for processing or creating an image, in an editor using the streaming processing method.

On the other hand, in the frame-by-frame processing, as described above, since it is implemented mainly by using software, unlike the streaming processing method, it is possible to handle a change in the video signal format or a change in the order of processing steps within one effect in a flexible manner.

However, the frame-by-frame processing, as shown in FIG. 20, is the one-frame completion type method according to a single task method in which several types of processing are performed on one frame sequentially from a previous stage (effect module) to a subsequent stage. Thus, the required time τ2 for processing one-frame is obtained by adding a time t1 required for reading out material from a disk, times t2 and t3 required for several types of effect processing, and a time t4 required for outputting from a memory. Therefore, in the frame-by-frame processing method, the speed of rendering processing is extremely low, which makes real-time processing difficult.

SUMMARY OF THE INVENTION

The present invention was made in view of the above-described problems. It is an object of the present invention to provide a device for image processing, a method for video editing, a system for video editing, and a computer readable recording medium on which a program for video editing is recorded which can deal with changes in format of video data to be processed and changes in the processing order in a flexible manner and which permit rapid rendering processing and realtime processing.

According to one aspect of the present invention, a device for video editing includes a frame processing means for retrieving a video frame that is a basic construction unit of video material from a recording and playing device storing video materials to be edited and for performing frame processing on the retrieved video frame, a frame storage unit for storing a plurality of the video frames having all the frame processing by the frame processing means is completed and for sequentially outputting the plurality of video frames, and a control unit for controlling the frame processing means such that at least some types of frame processing by the frame processing means are performed in parallel and video frames are output from the frame storage unit in realtime.

Here, the term "frame processing" means various processing performed on individual video frames. The frame processing includes image processing performed on video frames in order to achieve video special effects, read-out processing for reading out video frames from various memory units, writing processing for writing video frames into the memory units, and so on. Further, the term "in realtime" means "along a time axis that is standard when a video material is played back at a usual speed". Furthermore, the term "in a non-realtime manner" means "independent of the time axis that is standard when a video material is played back at a usual speed".

According to another aspect of the present invention, a method for video editing includes a frame processing step for retrieving a video frame that is a basic construction unit of the video material from the recording and playing device storing video materials to be edited and for performing frame processing on the retrieved video frame, a frame storage step for storing a plurality of the video frames having all the frame processing by the frame processing step is completed and a frame output step for sequentially outputting the plurality of stored video frames. In this case, at least some types of frame processing at the frame processing step are performed in parallel and video frames are output in realtime at the frame output step. In the description below, editing processing according to this method is sometimes called "super realtime (SuperRT) processing".

According to another aspect of the present invention, a system for video editing includes a recording and playing device allowing the record and the playback of video material, a frame processing means for retrieving a video frame that is a basic construction unit of the video material from the recording and playing device and for performing frame processing on the retrieved video frame, a frame storage unit for storing a plurality of the video frames having all types of frame processing by the frame processing means are completed and for sequentially outputting the plurality of video frames, and a control unit for controlling the frame processing means such that at least some types of frame processing by the frame processing means are performed in parallel and video frames are output from the frame storage unit in realtime.

According to another aspect of the present invention, a recording medium for recording a program for video editing includes a frame processing step for retrieving a video frame that is a basic construction unit of the video material from the recording and playing device storing video materials to be edited and for performing frame processing on the retrieved video frame, a frame storage step for storing a plurality of video frames having all frame processing by the frame processing step completed and a frame output step for sequentially outputting the plurality of stored video frames. In this case, at least some types of frame processing at the frame processing step are performed in parallel and video frames are output in realtime at the frame output step.

In the device for video editing, the method for video editing, the system for video editing, or the program for video editing recorded on the computer readable medium according to the present invention, video frames that are basic construction units of the video material is retrieved from the recording and playing device in frames, and frame processing is performed on the individual video frames. At least some types of frame processing are performed in parallel. Video frames having all types of frame processing completed are stored once. The plurality of stored video frames are sequentially output in realtime. In this way, the recording and playing device is used for performing non-linear editing of video material.

Therefore, the present invention is well suited for software image processing in which memories are interposed before and after image processing. Thus, it is possible to construct a device for video editing in which hardware and software are mixed and to perform video editing processing in which hardware and software are mixed. Further, irrespective of how complicated the editing processing is, it can be resolved into the smallest units of frame processing in order to achieve parallel processing uniformly. In addition, efficient parallel processing can be performed without any wasteful processing waiting time, for example. Still further, the efficiency for reading out frames from the recording and the playing device is improved, which allows the reduction of the processing time required for the entire editing processing. In particular, when an operational speed of the recording and playing device is slower than those of other resources, this benefic becomes significant. Furthermore, image processing on each video frame is performed by using both hardware and software. Thus, the flexibility of the system can be increased. For example, it is possible to address changes in processing order within one image processing step and/or extension of functions flexibly depending on a video signal format of the video material to be processed.

BRIEF DESCRIPTION OF THE DRAWINGS

FIG. 5 is a diagram showing a generic flow of editing processing performed on a video frame by the video editing system in FIG. 1;

FIG. 6 is a diagram showing the flow of a specific example of the editing processing shown in FIG. 3 on a video frame;

DESCRIPTION OF THE PREFERRED EMBODIMENTS

Figure 1:
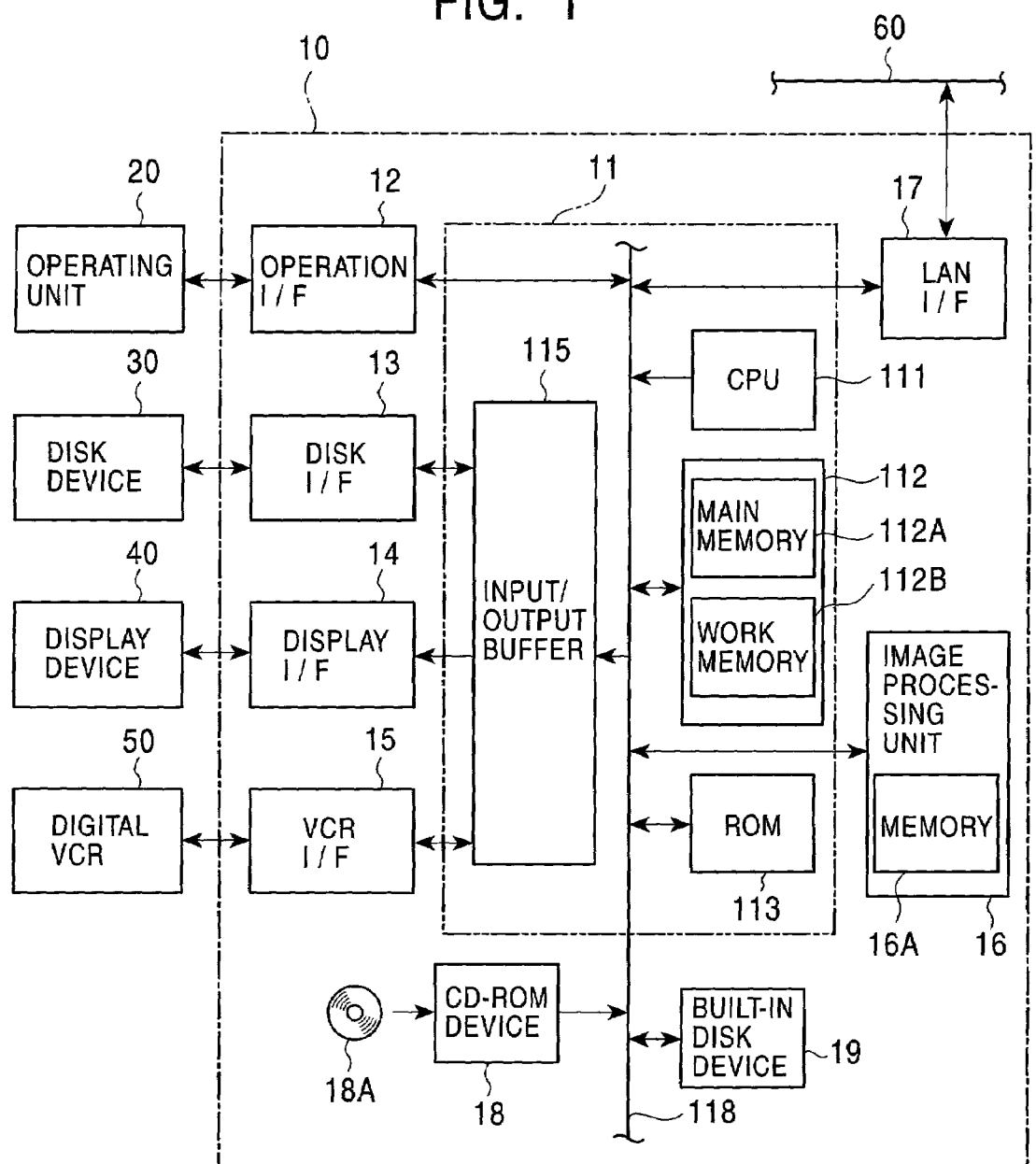
FIG. 1 is a block diagram schematically showing the hardware construction of a video editing system according to one embodiment of the present invention.

Embodiments of the present invention will be described in detail below with reference to drawings.

A video editing device and a video editing system including the device according to one embodiment of the present invention will be described with reference to FIG. 1. A video editing method (super-realtime processing method) and a computer readable recording medium on which a video editing program according to one embodiment of the present invention is recorded will be described together below since they are realized by the video editing device and the video editing system of this embodiment.

Configuration of Video Editing System

First of all, the construction of the video editing system will be described.

The video editing system includes an editing device main unit 10 having a function for performing non-linear editing on digitized video material, and so on, an operating unit 20, a disk device 30, a display device 40, a and a digital video cassette recorder (called "digital VCR" below) 50. The editing device main unit 10 is connected to the operating unit 20, the disk device 30, the display device 40, and the digital VCR 50. Here, the editing device main unit 10 corresponds to one specific example of a video editing device according to the present invention.

The editing device main unit 10 includes, a main controller 11, an operation interface (I/F) 12, a disk I/F 13, a display I/F 14, a VCR I/F 15, an image processing unit 16, a LAN I/F 17, a CD-ROM device 19, and a built-in disk device 18 including a recording medium such as hard disk. Here, the main controller 11 and the image processing unit 16 correspond mainly to one specific example of "frame processing means" of the present invention.

The main controller 11 controls the overall operation including an editing operation in the video editing system. The operation I/F 12 interfaces between the operating unit 20 and the main controller 11. The disk I/F 13 interfaces between the disk device 30 and the main controller 11 and includes, for example, a data compression portion, a data expansion portion, and a data format conversion portion (which are not shown). The display I/F 14 interfaces between the display device 40 and the main controller 11 and includes a Graphical User Interface (GUI). The VCR I/F 15 interfaces between the digital VCR 50 and the main controller 11. More specifically, the VCR I/F 15 converts serial data from the digital VCR 50 to parallel data in order to output it to the main controller 11. Further, the VCR I/F 15 converts parallel data from the main controller 11 to serial data in order to output it to the digital VCR 50.

The image processing unit 16 is constructed as a substrate module having a hardware circuit including a memory 16A. The image processing unit 16 can perform different kinds of image processing rapidly by utilizing the memory 16A as a work memory. The image processing includes a luminance conversion processing, wipe processing, color conversion processing, or fade-in/fade-out processing, for example. The LAN I/F 17 is a communication interface for connecting the main controller 11 to the LAN 60, which permits the exchange of data with another device (client computer, for example), which is not shown. Here, the image processing unit 16 corresponds to one specific example of "image processing means" of the present invention.

The CD-ROM device 18 drives a CD-ROM 18A that is a read-only mass storage medium so that an application program such as a video editing program recorded thereon can be read out. The built-in disk device 19 is a readable and writable storage device constructed by using a hard disk, for example. The video editing program read out from the CD-ROM 18A by the CD-ROM device 18 is installed therein. The video editing program which is set up is read out as necessary, and then at least a part of the program is stored in the main memory 112A of the main controller 11. Here, the CD-ROM 18A corresponds to one specific example of the computer readable recording media on which a video editing program is recorded.

Now, the main controller 11 will be described in detail.

The main controller 11 includes a central processing unit (CPU) 111, a memory unit 112 having random access memory (RAM), a read only memory (ROM) 113, and an input/output buffer 115. They are connected to each other through an internal bus 118.

The CPU 111 functions as a main part for the editing operation control of the present system and implements a video editing program stored in the main memory 112A for the video editing control. Here, the CPU 111 corresponds to one specific example of "control means" of the present invention.

The memory unit 112 includes a main memory 112A on which a control program such as a video editing program is stored, and a work memory 112B used as a work region for the editing operation. The work memory 112B is physically separate from the memory 16A built in the image processing unit 16. However, during the actual image processing, the work memory 112B and the memory 16A form a memory address space in order to function as a single work memory. Here, the memory address space formed by the work memory 112B and the memory 16A corresponds to "first memory means" and "second memory means" according to the present invention.

The ROM 113 stores a basic program such as, for example, a basic input output system (BIOS) and predetermined system parameters, and they are referenced when the device is started.

The input/output buffer 115 is connected to the internal bus 118 and is further connected to the disk I/F 13, the display I/F 14, and the VCR I/F 15. The input/output buffer 115 stores video data for several frames created through editing processing performed under the control of the CPU 111. Further, the input/output buffer 115 is used for exchanging data between the disk I/F 13 and the VCR I/F 15. Here, the input/output buffer 115 corresponds to one specific example of "frame storage means" according to the present invention.

Next, the operating unit 20, the disk device 30, the display device 40, and the digital VCR 50 will be described.

The operating unit 20 includes an operating device such as a track ball panel, a keyboard and a jog/shuttle panel, or audio fader panel, and is connected to the operation I/F 12 in the editing device main unit 10. A user uses the operating tool by looking at the display device to input editing instruction, for example, so that he/she can perform different kinds of editing operations on video material stored on the disk device 30. Here, the operating unit 20 corresponds to one specific example of "input means" according to the present invention.

The disk device 30 is a memory device having a hard disk constructed as a memory medium, which can be read or written in a random access manner. The disk device 30 is connected to the disk I/F 13 in the editing device main unit 10 through a rapid transmission path such as a fiber channel. As described above, the disk I/F 13 performs compressing and encoding processing for video data to be written in the disk device 30, decoding (expansion) processing for video data read out from the disk device 30, or format conversion of image data. The disk device 30 stores compressed video data and/or audio data and can read out and output the stored data for each video frame. Here, the disk device 30 corresponds to a "memory playback device" according to the present invention.

The display device 40 is a display device such as a cathode-ray tube (CRT) and a liquid crystal device (LCD) and can perform display by a GUI function of the editing device main unit 10. The display device 40 is connected to the display I/F 14 in the editing device main unit 10.

The digital VCR 50 records video material, for example on a digital video cassette tape (caller "video tape" below), which is not shown, and plays back the video material recorded thereon. The digital VCR 50 is connected to the VCR I/F 15 in the editing device main unit 10.

In the video editing system shown in FIG. 1, a portion relating to editing of audio signals is not shown and the description thereof is omitted here.

Next, referring to FIG. 2, a main configuration of a video editing program used in the video editing system will be described.

Figure 2:
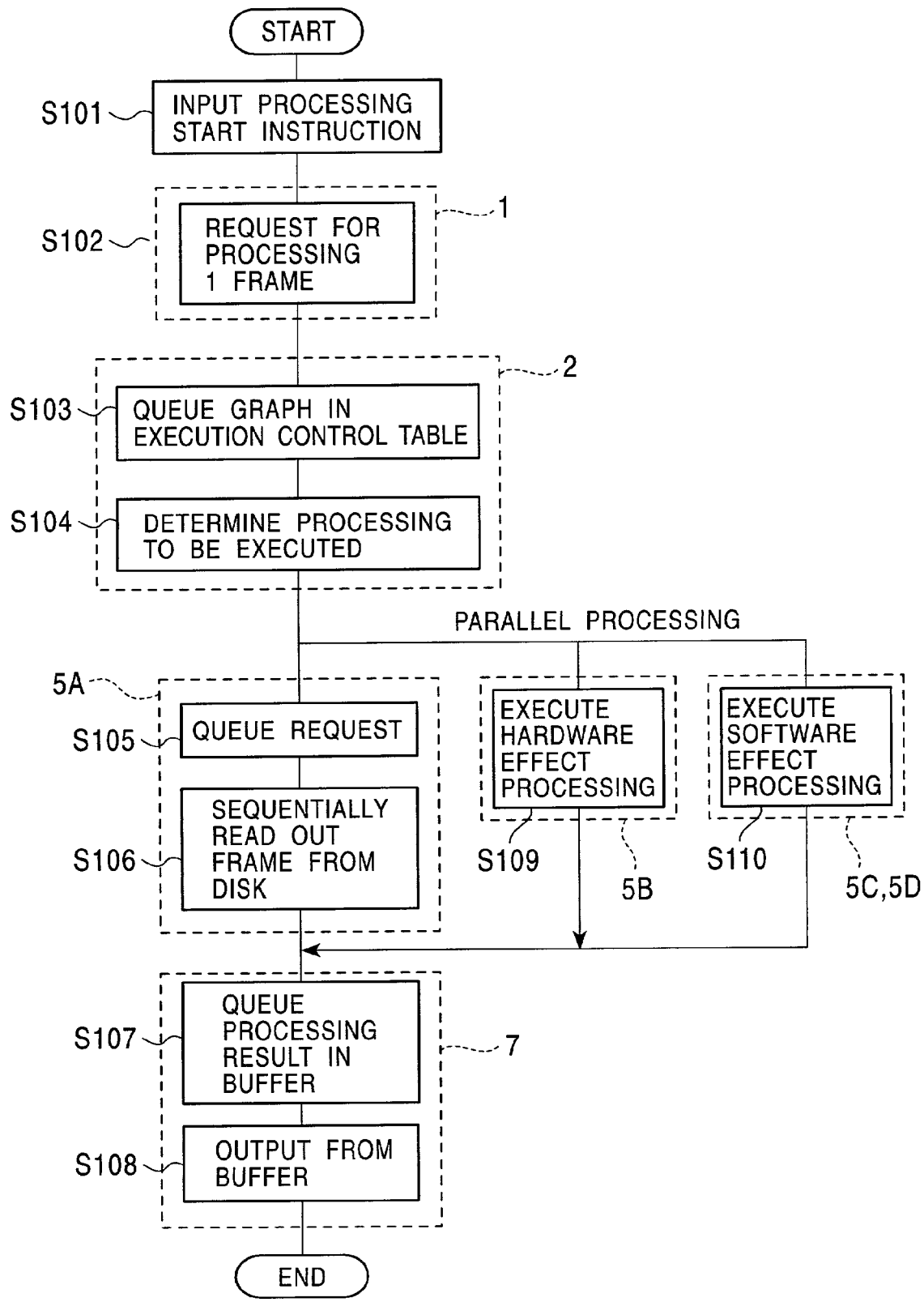
FIG. 2 is a diagram schematically showing the configuration of a video processing program used in the video editing system in FIG. 1.

FIG. 2 shows the configuration of a main portion and processing overview for each part of the video editing program installed in the built-in disk device 19. The present program includes a client object 1, a frame-by-frame control object (called "FBF control object" below) 2, a disk read-out object 5A, a hardware image conversion object 5B, software conversion objects 5C and 5D, and an output module 7. Further, the program includes, though not shown in FIG. 2 but shown in FIGS. 15 and 16 described below, medium abstraction objects 4A, 4B, and 4C, and effect abstraction objects 4E and 4F.

Here, the term "object" refers to one independent entity in which data and a function called a method for operating the data are combined. The objects collaboratively operate by exchanging messages with each other. Programming using such objects allows more advanced modularization of a program and an improvement in the reusability of modules.

Each object will be described below. Here, before describing each object, for easier description and understanding, (i) a specific example of video editing will be provided first, and then (ii) specific functions of each object will be described with the specific example.

(i) Specific Example of Video Editing

Figure 3:
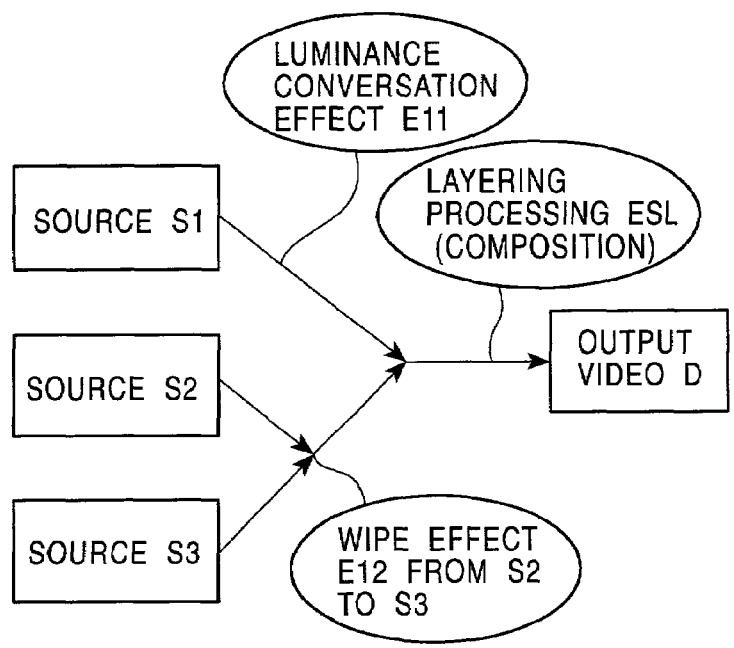
FIG. 3 is a diagram showing one specific example of the contents of editing processing performed by the video processing system in FIG. 1.
Figure 4A:
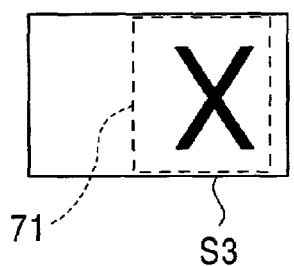
FIG. 4 is a diagram for explaining one example of wipe processing.
Figure 4B:
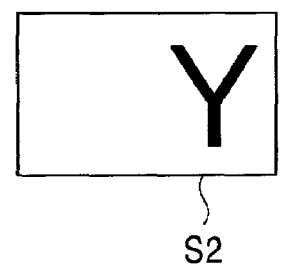
Figure 4C:
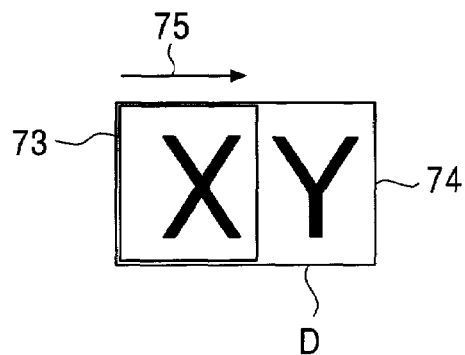

In the present specific example, as shown in FIG. 3, a luminance conversion effect E11 that is a first type of effect processing is performed on given video material (source S1), and a wipe effect E12 that is a second type of effect processing is performed on two other video materials (sources S2 and S3). Then, the video resulting from the wipe effect E12 and the video resulting from the luminance conversion effect E11 are composed by rendering processing ESL that is a third type of effect processing. The source S1 is video material which will be a foreground after the composition, while the sources S2 and S3 are video materials, as shown in FIGS. 4A and 4B, which are located by being overlapped on the foreground. Wiping is processing as shown in FIG. 4(C), for example, in which video "X" of the source S3 gradually covers, from the left, video "Y" of the source S2 which initially occupies the entire screen and finally the entire screen is occupied by the video "X" of the source S3.

Figure 10:
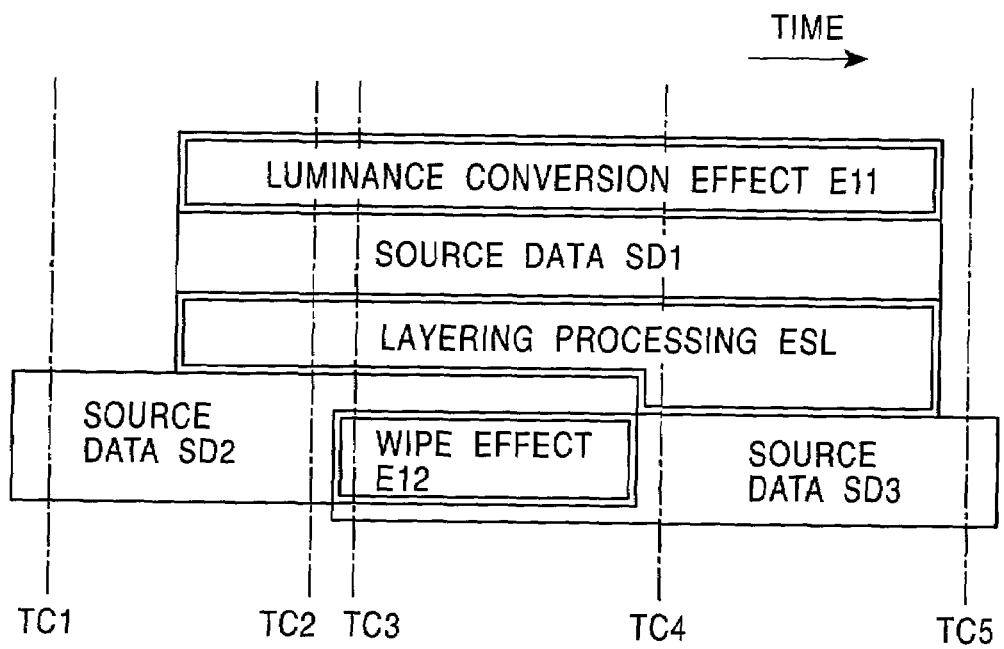
FIG. 10 is a diagram showing an editing chart created in the specific example of the editing processing in FIG. 3 and a method of time slicing therein.

An instruction causing the video editing shown in FIG. 3 is input by a user through the operating unit 20 (FIG. 1) and is written in the work memory 112B in the editing device main unit 10. Further, the instruction is displayed on a time-line window in an editing screen (not shown) of the display device 40 as an editing chart as shown in FIG. 10, for example. The content of the editing chart corresponds to one specific example of an "editing schedule" according to the present invention.

In FIG. 10, the horizontal direction indicates time, and the vertical direction indicates the relationship between each effect period and a source data period. Source data SD1 from the source S1 overlaps the luminance conversion effect E11 and the layering processing ESL in the whole period. Further, the last half of the period of source data SD2 from the source S2 overlaps the first half of the period of the source data SD2 from the source S3, and the overlap period will be a period for wipe effect E12. Furthermore, a period from a mid point of the source data SD2 to a little short of the end of the source data SD3 overlaps all of the source data SD1, the luminance conversion effect E11, and the layering processing ESL. The overlap period includes an overlap period for overlapping the source data SD2 and the source data SD3 (a period for wipe effect E12).

(ii) Specific Functions of Each Object

Functions of each object will be described by using the specific example (FIG. 3) with reference to FIG. 2. In FIG. 2, step S101 is a type of processing performed by a user while steps S102 to S110 are performed by objects.

(1) Client Object 1

This object has a function for requesting an FBF control object 2 for processing one video frame (step S102) when a user inputs a processing start instruction (step S101). More specifically, the client object 1 sequentially slices an editing chart shown in FIG. 10 in the direction from left to right (direction of the time flow) along the time axis in order to create dependency relationship graphs G1 to G5, as shown in FIGS. 12 to 16, for example. Further, the client object 1 sends a processing request message (simply called "message") including the dependency relationship graphs G1 to G5 and predetermined parameters (variables) to the FBF control object 2. Here, in the message, an address on the input/output buffer 115 (simply called "buffer address" below) for storing frames, on which final processing is performed completely, is included in advance. An interval of the time slice is a time interval equivalent to one frame at the time of playback (an interval of ⅓₀ sec., for example)

However, the time-slice processing is performed internally in a shorter interval than the time interval. A position of each time slice on the time axis is indicated by each of time codes TCs. In FIG. 10, slices at time codes TC1 to TC5 are shown as typical time slice positions. Here, the dependency relationship graphs correspond to one specific example of "processing management data" according to the present invention.

Now, the meaning of the dependency relationship graphs G1 to G5 shown in FIGS. 12 to 16, respectively, will be described.

Figure 12:
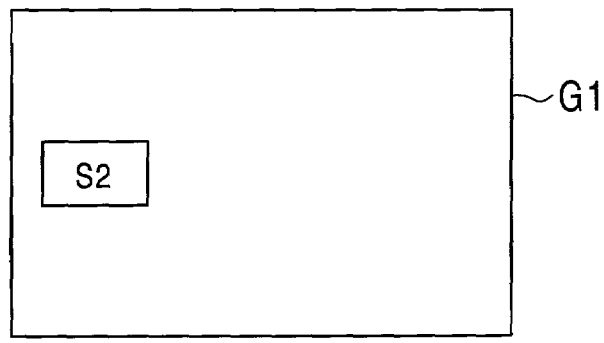
FIG. 12 is a diagram showing one example of the dependency relationship graph created from the editing chart shown in FIG. 10.

FIG. 12 shows the dependency relationship graph G1 created from a slice at a position of the time code TC1 in FIG. 10. The time code TC1 is located within a period where only the source data SD2 exists. Therefore, the graph only includes a type of processing for reading out the source data SD2 from the source S2.

Figure 13:
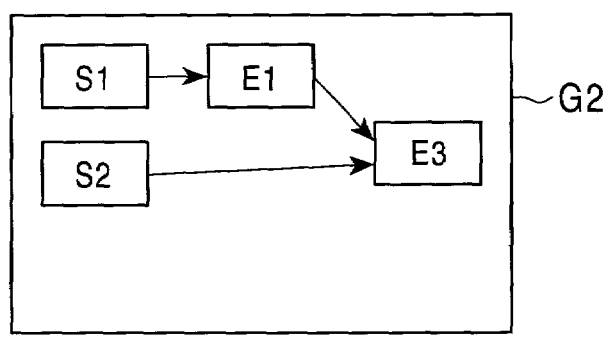
FIG. 13 is a diagram showing another example of the dependency relationship graph created from the editing chart shown in FIG. 10.

FIG. 13 shows the dependency relationship graph G2 created from a slice at a position of the time code TC2 in FIG. 10. The time code TC2 is located within a period where the source data SD1, the source data SD2, the luminance conversion effect E11, and the layering processing ESL are overlapped. Therefore, the graph includes processing for reading out the source data SD1 and SD2 from the sources S1 and S2, respectively, processing for performing the luminance conversion effect E11 on the source data SD1, and processing for performing the layering processing ESL on the result of the luminance conversion effect E11 and the source data SD2.

Figure 14:
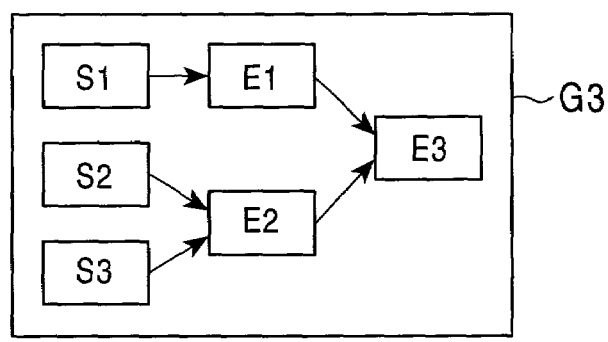
FIG. 14 is a diagram showing another example of the dependency relationship graph created from the editing chart shown in FIG. 10.

FIG. 14 shows a dependency relationship graph G3 created from a slice at a position of the time code TC3 in FIG. 10. The time code TC3 is located within a period where the source data SD1, the source data SD2, the source data SD3, the luminance conversion effect E11, the wipe effect E12, and the layering processing ESL are all overlapped. Therefore, the graph includes processing for reading out the source data SD1, SD2, and SD3 from the sources S1, S2, and S3, respectively, processing for performing the luminance conversion effect E11 on the source data SD1, processing for performing the wipe effect E12 on the source data SD2 and the source data SD3, and processing for performing the layering processing ESL on the result of the luminance conversion effect E11 and the result of the wipe effect E12.

Figure 15:
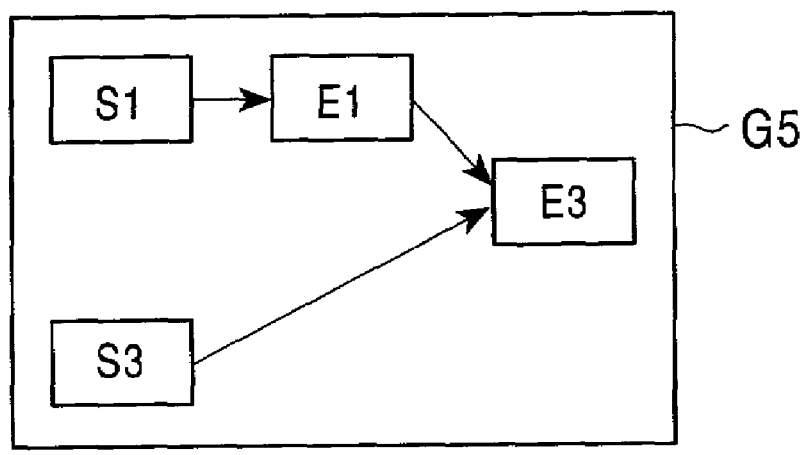
FIG. 15 is a diagram showing another example of the dependency relationship graph created from the editing chart shown in FIG. 10.

FIG. 15 shows the dependency relationship graph G4 created from a slice at a position of the time code TC4 in FIG. 10. The time code TC4 is located within a period where the source data SD1, the source data SD3, the luminance conversion effect E11, and the layering processing ESL are overlapped. Therefore, the graph includes processing for reading out the source data SD1 and SD3 from the sources S1 and S3, respectively, processing for performing the luminance conversion effect E11 on the source data SD1, and processing for performing the layering processing ESL on the result of the luminance conversion effect E11 and source data SD3.

Figure 16:
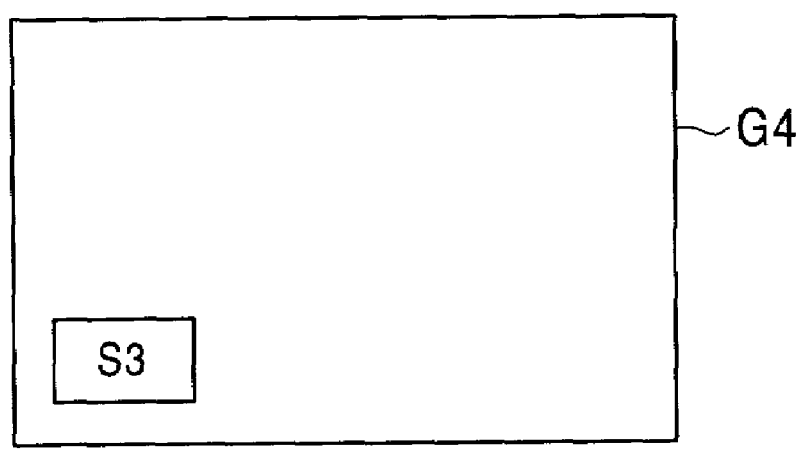
FIG. 16 is a diagram showing another example of the dependency relationship graph created from the editing chart shown in FIG. 10.
Figure 17:
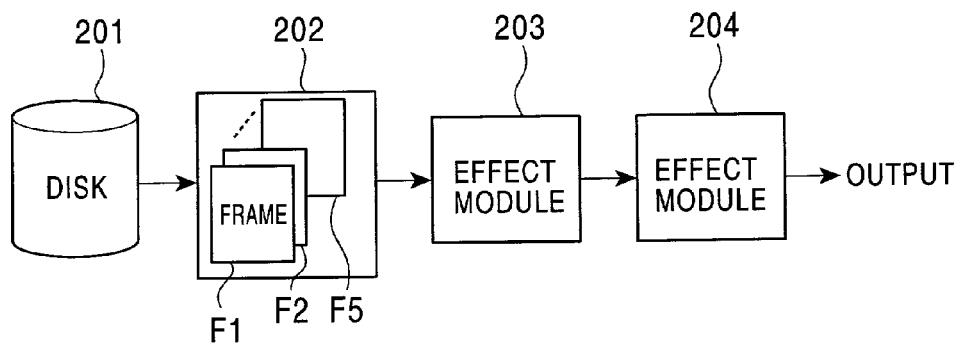
FIG. 17 is a diagram showing the flow of a conventional streaming processing method on a video frame.
Figure 18:
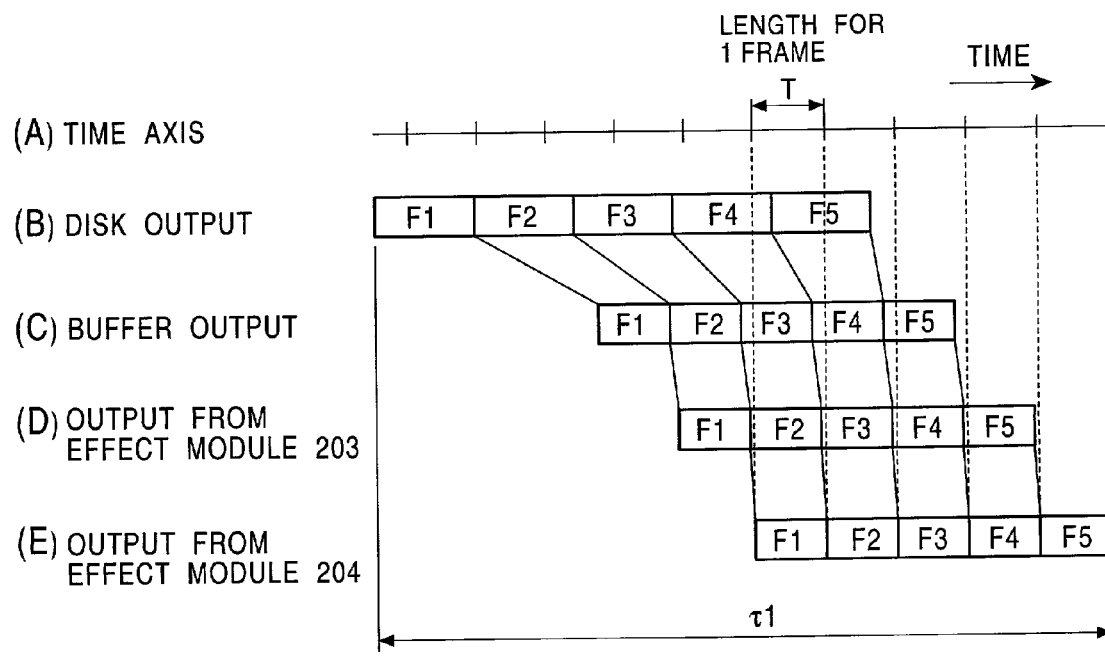
FIG. 18 is a diagram showing frame processing timing in the method shown in FIG. 17.
Figure 19:
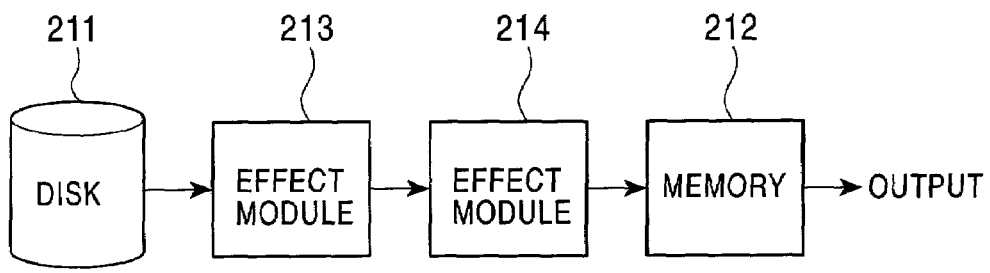
FIG. 19 is a diagram showing the flow of a conventional frame-by-frame processing method on a video frame.
Figure 20:
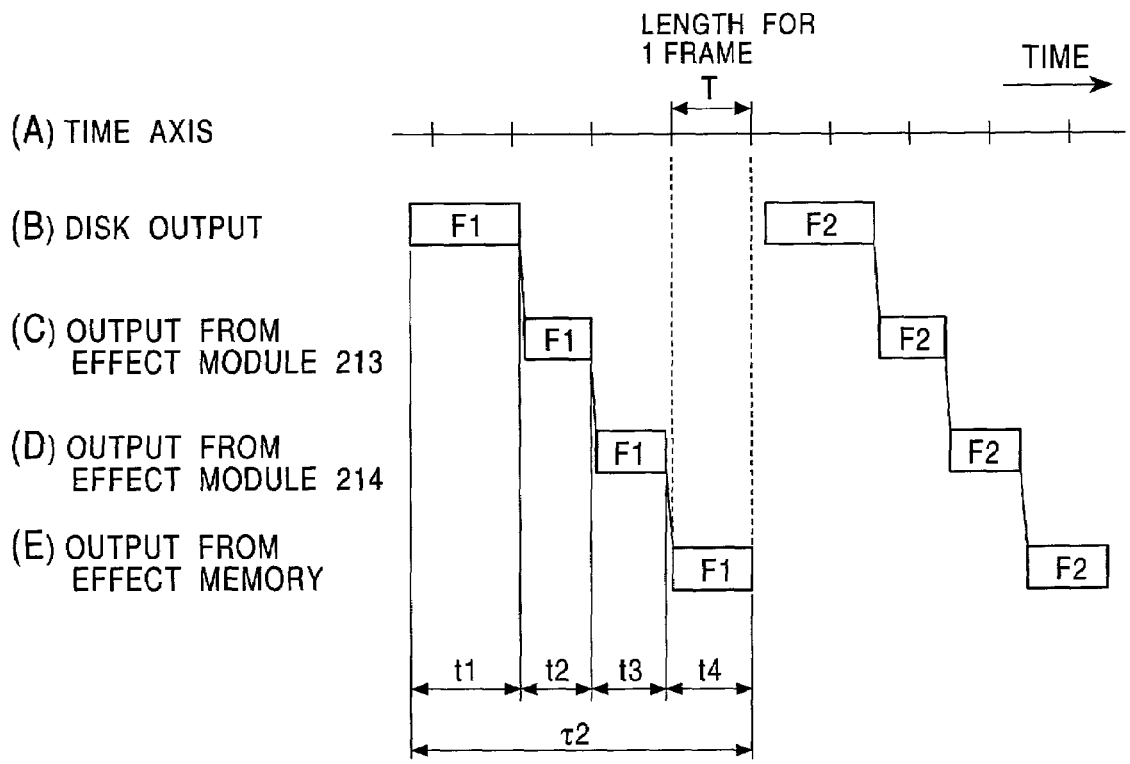
FIG. 20 is a diagram showing the frame processing timing in the method shown in FIG. 18.

FIG. 16 shows a dependency relationship graph G5 created from a slice at a position of the time code TC5 in FIG. 10. The time code TC5 is located within a period where only the source data SD3 exists. Therefore, the graph only includes a type of processing for reading out the source data SD3 from the source S3.

(2) FBF Control Object 2

Figure 11:
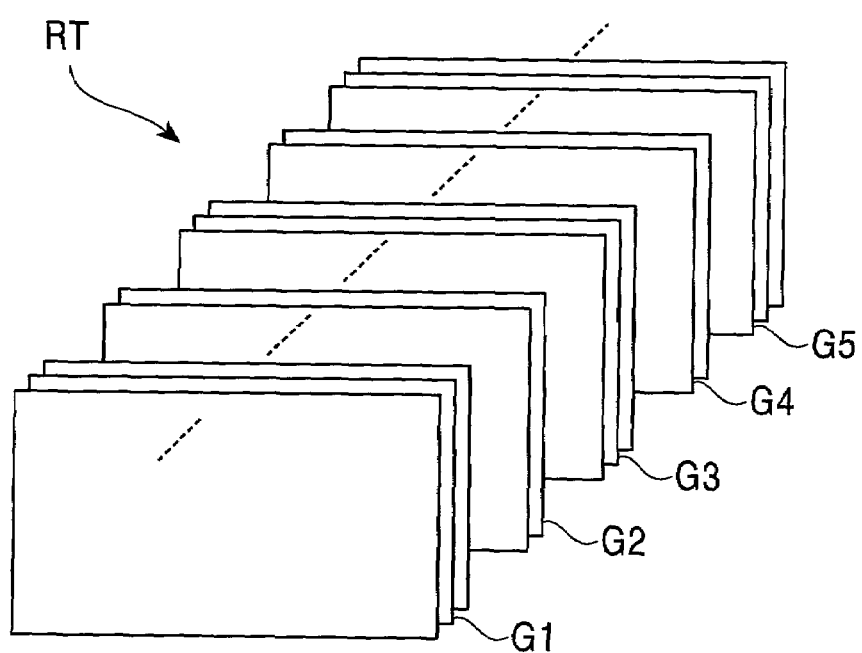
FIG. 11 is a diagram showing a dependency relationship graph created from the editing chart shown in FIG. 10 registered in a rendering table.

This object has a function for queuing (storing in order of input) the dependency relationship graphs received from the client object 1 (S103) and for analyzing the queued dependency relationship graphs in order to determine the type of processing to be executed (step S104). More specifically, the FBF control object 2 sequentially registers the dependency relationship graphs G1 to G5 received from the client object 1 in a rendering table RT as shown in FIG. 11, for example. Next, the FBF control object 2 searches among the dependency relationship graphs G1 to G5 registered in the rendering table RT. Then the FBF control object 2 selects one type of processing that satisfies the dependency relationship (that is, executable in time and in order) and then passes a message for requesting an execution of the processing to a thread. Here, the term "thread" indicates an execution unit (or execution path) for a type of processing. While the term "object" indicates the object (target) for execution, the term "thread" indicates the subject for execution. "Thread" will be described briefly below.

Generally, in a multi-tasking system in which a plurality of programs can be executed simultaneously, an independent memory space or I/O space, for example, is apparently assigned to each program so that each program apparently operates by itself. Thus, each program does not have to be aware of interoperations with the other programs executed simultaneously. In the multi-tasking system, an execution unit for a program independently having a resource such as a memory and a disk is called a process. However, in the multi-tasking system, when switching the execution of one process to the other, the contents of the current CPU registers must be stored entirely or the register values for a process for switching control must be loaded. Thus, independence of the processes can be ensured but the load for the processes is extremely large. A multi-threading system allows multi-tasking processing within the same process without the need for the processing of switching processes having such a large load. An execution unit (or execution path) of a task in this case is called thread. In the multi-threading system, the execution unit is managed by the thread. When a process is created, at least one thread is created at the same time, among threads within the same process, the load for switching processing is small. Further, threads can communicate with each other without involving communication between processes having a large load since the memory or the I/O resource, for example, is shared, which is a merit of the multi-threading system.

(3) Disk Read-Out Object 5A

This object functions as a disk manager for reading out, by frame, video material from the disk device 30 in hardware in response to a request from the FBF control object 2. More specifically, the disk read-out object 5A queues and stores a request message for readout by frame passed from the FBF control object 2 in the multi-threading method (step S105). Then, the disk read-out object 5A searches a series of frames as video in a plurality of frames to be processed indicated by a plurality of queued messages, respectively, when actually accessing the disk device 30. Then, the entire series of frames is read out from the disk device 30 and is written in an address specified in the work memory 112B (FIG. 1) (simply called "memory address" below) (step S106). In this way, a method in which a series of frames is read out after being queued is applied in order to keep the performance of the device 30, which is slower than other resources in general, fast.

(4) Hardware Image Conversion Object 5B

This object has a function for using a hardware resource (the image processing unit 16, here) in response to a request from the FBF control object 2 in order to perform a predetermined type of effect processing (hardware effect processing) on a specified frame (step S109). More specifically, a memory address corresponding to one frame is specified and a predetermined type of image processing (the luminance conversion effect E11, here) is performed on a frame at the specified memory address. Then the processing result is written in a specified memory address or buffer address. Such a processing method in which data read out from the memory is processed and returned to the memory again is used generally in software image processing. In this respect, it is possible to deal with hardware processing in the same manner as software processing.

(5) Software Image Conversion Objects 5C and 5D

These objects have a function for using software in response to a request from the FBF control object 2 in order to perform a predetermined type of effect processing (software processing) on a specified frame (step S110). More specifically, one frame is read out from a specified memory address, and a predetermined type of image processing (wipe effect E12 or layering processing ESL, here) is performed on the frame by software. Then, the processing result is written in a specified memory address or buffer address again.

(6) Output Module 7

This module has a function for storing a result from asynchronous, parallel processing by the hardware image conversion object 5B or the software image conversion objects 5C and 5G for each frame in the input/output buffer 115 (FIG. 1) in the main controller 11 in order to output those frames in proper order in realtime. More specifically, each time the effect processing is completed on the hardware image conversion object 5B or software image conversion objects 5C and 5D, the output module 7 receives from the object, as a message, a buffer address where an effect-processed frame is stored and a time code TC corresponding to the frame, and then the message is queued. The order of a plurality of received messages does not follow the order requested initially by the client object 1, and no special order is observed. This is because each kind of processing is performed on the hardware image conversion object 5B and/or software image conversion objects 5C and 5D mutually in an asynchronous and parallel manner, and the order in which the types of processing are completed is not determined. The output module 7 sequentially outputs frames from the input/output buffer 115 in an order indicated by the time codes TC in synchronization with an output clock (not shown) when a predetermined number of frames are stored in the input/output buffer 115. Thus, video having the editing processing performed thereon is output in the proper order.

(7) Medium Abstraction Objects 4A, 4B, and 4C

Figure 8:
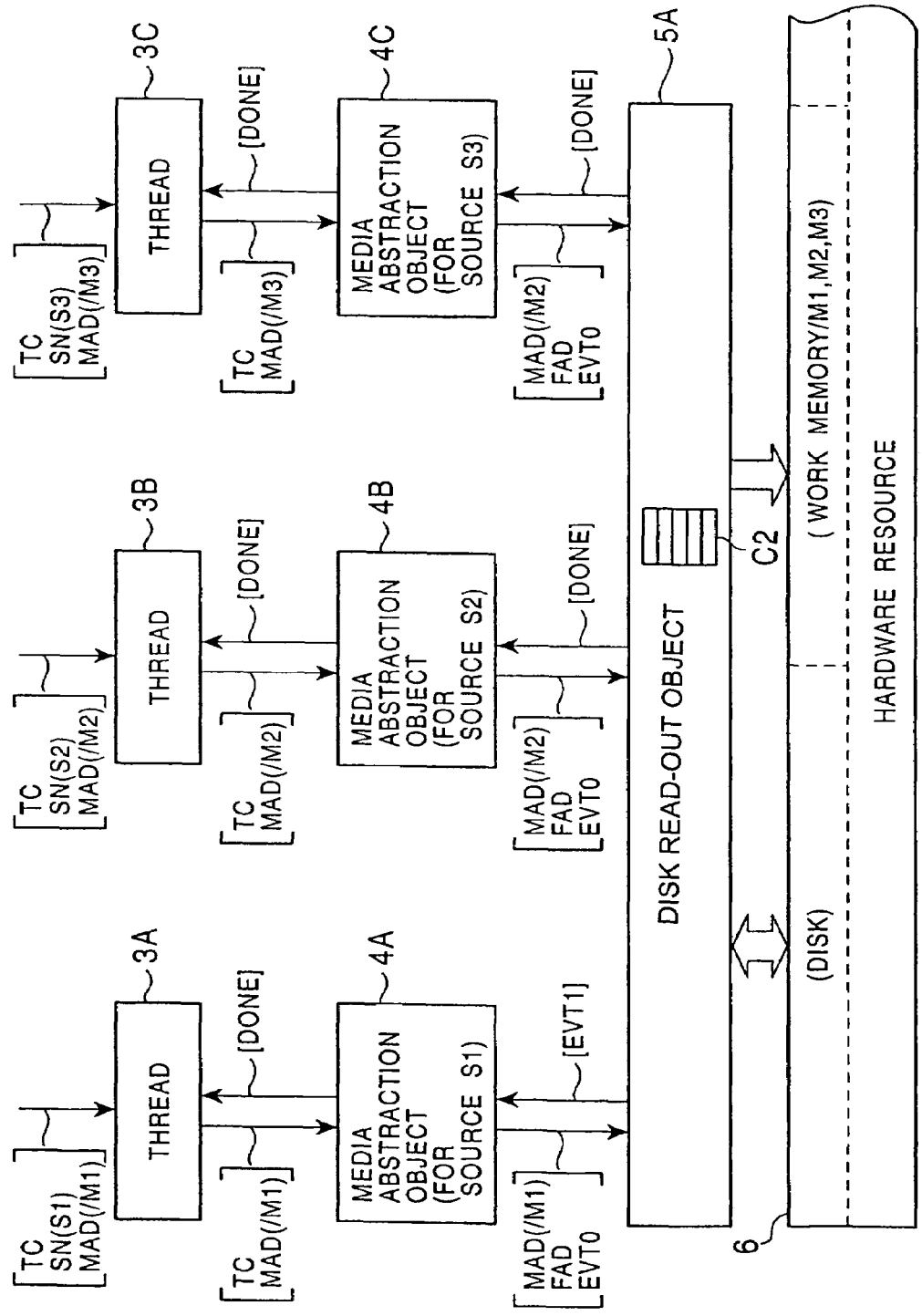
FIG. 8 is a flowchart showing processing steps after FIG. 7.

Though these objects are not shown in FIG. 2, in reality, as shown in FIG. 8 described below, they are interposed between the FBF control object 2 and the disk read-out object 5A and have a function for abstracting the disk device 30 as a recording medium which is actually present.

According to the "abstraction" here, various types of resources actually existing are uniformly represented in an abstract matter so that they can be dealt with externally as if they function in a single uniform manner. For example, when the $N^{th}$ frame in the source S1 is retrieved from the disk device 30, the FBF control object 2 may only pass, to the medium abstraction object 4A, a source identifier for identifying the source S1 (a predetermined unique ID with respect to each source), a time code TC, and a memory address in which a retrieved frame is stored. The FBF control object 2 does not need to know a frame address indicating where an intended frame is recorded on the disk (more specifically, that the frame is the Nth frame in the source S1). Once the medium abstraction object 4A receives the source identifier, the time code TC, and the memory from the FBF control object 2, the medium abstraction object 4A passes to the disk read-out object 5A a message including a frame address ("N", here) on the disk device 30 and a memory address where the retrieved frame is stored. That is, the FBF control object can access the resource thereby without knowing what the resource is. It should be noted that in this specific example, three medium abstraction objects 4Am, 4B, and 4C are prepared corresponding to the sources S1, S2, and S3, respectively.

(8) Effect Abstraction Objects 4D, 4E, and 4F

Figure 9:
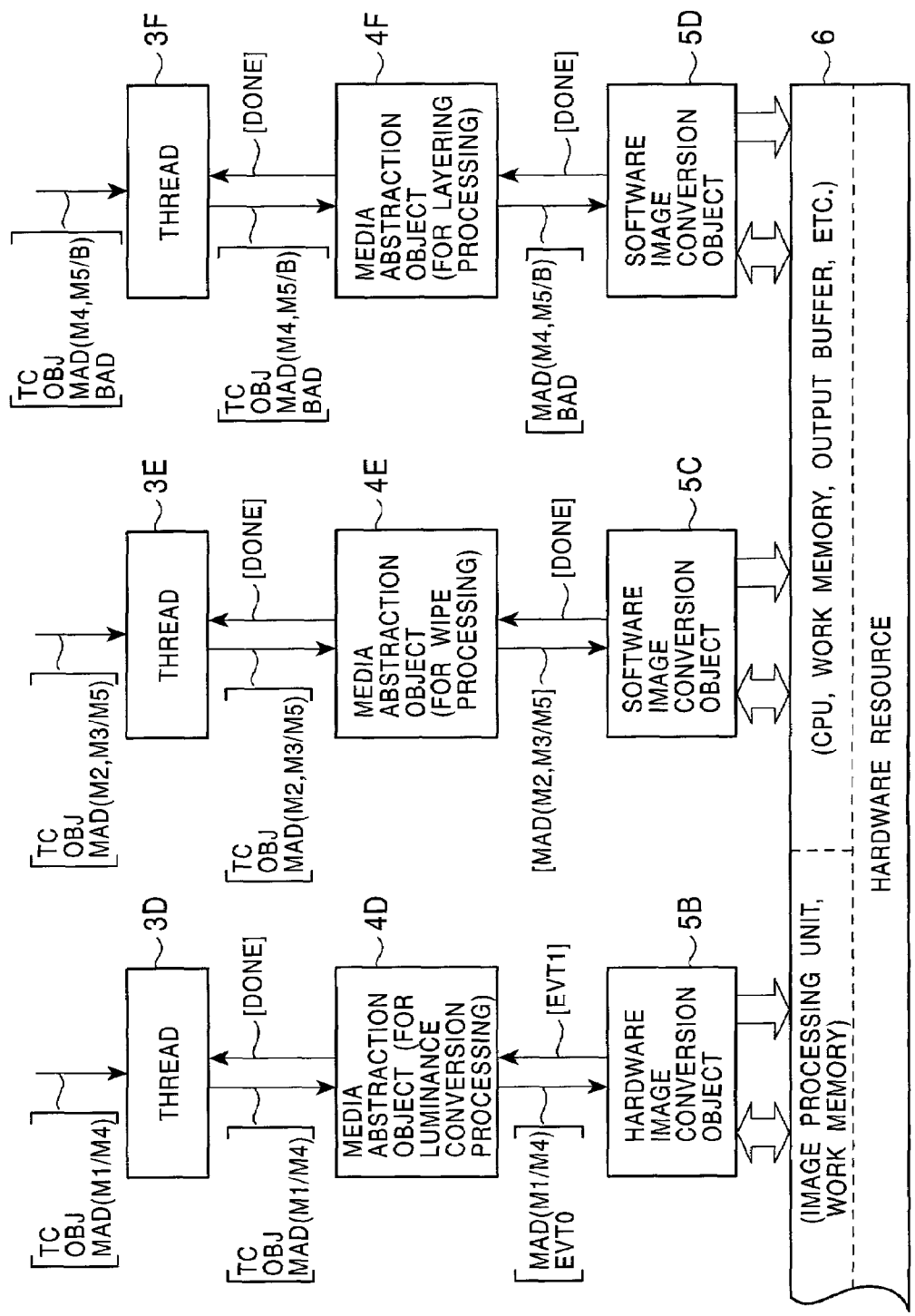
FIG. 9 is a flowchart showing other processing steps after FIG. 7.

Effect abstraction objects 4D, 4E, and 4F are not shown in FIG. 2. However, in reality, as shown in FIG. 9 described below, they are interposed between the FBF control object 2 and the hardware image conversion object 5B and the software image conversion objects 5C and 5D, respectively, and they have a function for abstracting an image processing unit 16 as an image processing means using hardware and an image processing program portion as an image processing means using software. The conceptual meaning of "abstraction" here is the same as that in the case of (7) above. The above-described image processing program is included in the video editing program.

The FBF control object 2 only needs to pass, to the effect abstraction objects 4D, 4E, and 4F, an effect identifier (an uniquely defined ID for an individual effect) for identifying an effect, a time code TC, and a memory address where the frame to be processed is stored. The FBF control object 2 does not need to specifically define what kind of image processing means should be used for performing an intended effect. The effect abstraction objects 4D, 4E, and 4F hold effector correspondence tables (not shown), in which effect identifiers and the hardware image conversion object 5B and the software image conversion objects 5C and 5F as units for managing execution of each type of effect processing are mapped. Then, each of the effect abstraction objects 4D, 4E, and 4F selects an image conversion object (either one of 5B, 5C, and 5D, here) to be actually used from the effector correspondence table based on the effect identifier received from the FBF control object 2, and passes a message including a parameter required for the real effect processing to the selected image conversion object. The parameter includes a memory address where a frame to be processed is stored, and a memory address where a completely processed frame is stored. In this way, since each of the effect abstraction objects 4D, 4E, and 4F functions as a so-called selector in order to select a resource called an effector, the FBF control object 2 can use a necessary resource without knowing the type of the resource. In this specific example, the hardware image conversion object 5B is prepared for the luminance conversion effect E11, while the software image conversion objects 5C and 5D are prepared for the wipe effect E12 and layering processing ESL, respectively.

Operations and Effects of Video Editing System

Next, operations of the video editing system having the above configuration will be described.

First of all, a basic operation of the entire video editing system will be described.

A video tape (not shown) on which video material taken by using, for example, a video camera (not shown) is recorded, or a video tape (not shown) on which video material created by using, for example, computer graphics is recorded is set in the digital VCR 50. The digital VCR 50 reads out and sends to the editing device main unit 10 the video material on the video tape as a data stream. The main controller 11 in the editing device main unit 10 outputs, through the input/output buffer 115 and the disk I/F 13, the video data sent from the digital VCR 50 via the VCR I/F 15 in order to store it in the disk device 30 once. The video data stored in the disk device 30 is sequentially read out in video frames by the editing device main unit 10, and non-linear editing is performed on the desired content thereof. The editing result is stored in the input/output buffer 115 once, and then it is output to and displayed on the display device 40 via the display I/F 14. Here, the editing result stored in the input/output buffer 115 once may be output to the digital VCR 59 via the VCR I/F 15 again and may then be stored on another video tape. Alternatively, the editing result stored in the input/output buffer 115 once may be output to and recorded on the disk device 30 via the disk I/F 13. The CPU 111 controls the selection of where it is output.

Next, operations regarding editing processing of the video editing system will be described in detail with reference to FIGS. 5 and 6.

FIG. 5 conceptually (generally) shows super-realtime processing by the video editing system in FIG. 1 by focusing on the flow of video frames. FIG. 5 shows portions processed by hardware and portions processed by software depicted without any distinction. Further, identical reference numerals are given to the elements identical to the hardware portions in FIG. 1.

As shown in FIG. 5, in this embodiment, various processing is performed on video material taken from the disk device 30 in frames. The work memory 112B is always interposed between processing at one stage and processing at the next stage. Further, a plurality of types of processing are performed in parallel at one stage. More specifically, the processing is as follows:

First of all, the source data SD1 to SDi of the video material to be edited (sources S1 to Si), where i is a positive integer, which is stored in the disk device 30, are read out in frames and stored in respective specified regions in the work memory 112B, once. Here, sequential frames are readout together for each source. The source data SD1 to SD1 stored in the work memory 112B once are read out as necessary and go to the effect processing ES1 at the first stage. At the stage of the effect processing ES1, a plurality of types of effect processing E11 to E1j are performed in parallel where j is a positive integer.

Each of the frames processed at the stage of the effect processing ES1 is stored in another specified region in the work memory 112B once. The frames stored in the work memory 112B once are read out as necessary and sent to the next effect processing ES2 stage. At the effect processing ES2 stage, a plurality of types of effect processing E21 to E2k are performed in parallel, where k is a positive integer. Each of the frames processed at the effect processing ES2 stage is stored in another specified region in the work memory 112B once. Similarly, every time a type of effect processing at one stage ends, the processing result is stored in the work memory 112B once and then goes to the next effect processing. In FIG. 5, only the types of effect processing ES1 and ES2 are shown as the effect processing, and other types of effect processing are omitted.

The layering processing ESL is performed on frames on which all types of effect processing have been performed completely in order to create edited frames Fl to Fp, which are stored sequentially in the input/output buffer 115. However, in some editing, layering processing ESL may not be performed. The plurality of frames stored in the input/output buffer 115 are output in real time in synchronization with an output clock (not shown). Output video D is sent to the display device 40 (FIG. 1) via the display I/F 14, for example.

FIG. 6 shows editing processing more specifically according to the above described specific example (FIG. 3) by focusing on the flow of video frames. It should be noted that FIG. 6 is created by changing the processing in FIG. 5 in order to correspond to the content in the dependency relationship graph G3 shown in FIG. 14 according to the above-described specific example. In FIG. 6, portions processed by using hardware and software are shown together without any distinction, and identical reference numerals are given to elements identical to those shown in FIG. 5.

In this specific example, five memories M1 to M5 are reserved in the memory region of the work memory 112B. Further, these memories are used to perform the luminance conversion effect processing by using hardware for the effect E11 in the effect processing ES1 and the wipe effect processing by using software for the effect E12, each of whose processing results are composed in turn. In this specific example, the type of effect processing ES2 and the others in FIG. 5 are not performed, and only the effect processing ES1 and the layering processing ESL are performed. More specifically, the processing is as follows:

First of all, the source data SD1 to SD3 to be edited, which are stored in the disk device 30, are read out in frames and stored in the memories M1 to M3 of the work memory 112B, respectively, once. Here, a plurality of sequential frames are readout together for each source. The source data SD1 to SD3 stored in the memories M1 to M3, respectively, are read out as necessary when ready, and go to the effect processing ES1 stage. In the effect processing ES1 stage, two types of effect processing E11 and E12 are performed in parallel. Here, the order of frames to be processed is not always the same as the order of frames in the original video, but those types of processing are performed on an executable frame first.

The effect processing E11 is the luminance conversion effect so that a type of processing for changing image brightness is performed on the source data SD1 (frame of the source S1). The effect processing E12 is the wipe effect so that frame switching is performed by wiping from the source data SD2 (frame of the source S2) to the source data SD3 (frame of the source S3). The wipe processing is performed as follows: First of all, as shown in FIG. 4, a whole frame including an image portion "Y" in the source data SD3 (FIG. 4B) is specified as an input, and a whole frame 74 of an output image D (FIG. 4C) is specified as the output location. Next, a frame line portion 71 including the image portion "X" of the source data SD2 (FIG. 4B) is specified as an input, and a frame line portion 73 of the output image D (FIG. 4C) is specified as the output location. Thus, a part of the source S2 is replaced by the image of the source S3. Then, the processing result (processed frame) is stored in the memory M5. The above-described processing is performed by moving in the direction of an arrow 75 (FIG. 4C) frame by frame sequentially in order to achieve the wipe processing.

The frame processed by the effect processing E11 is stored in the memory M4 of the work memory 112B once while the frame processed by the effect processing E12 is, as described above, stored in the memory M5 of the work memory 112B once. The frames stored in the memories M4 and M5 once are subsequently read out as necessary, and the layering processing is then performed where both frames are overlapped and composed. Then, edited frames F1 to Fp are created in no special order and stored in the input/output buffer 115. The plurality of frames stored in the input/output buffer 115 are rearranged in order and output in synchronization with an output clock (not shown) in real time and in the right frame order. The output video D is sent to the display device 40 (FIG. 1) via the display I/F 14, for example.

Figure 7:
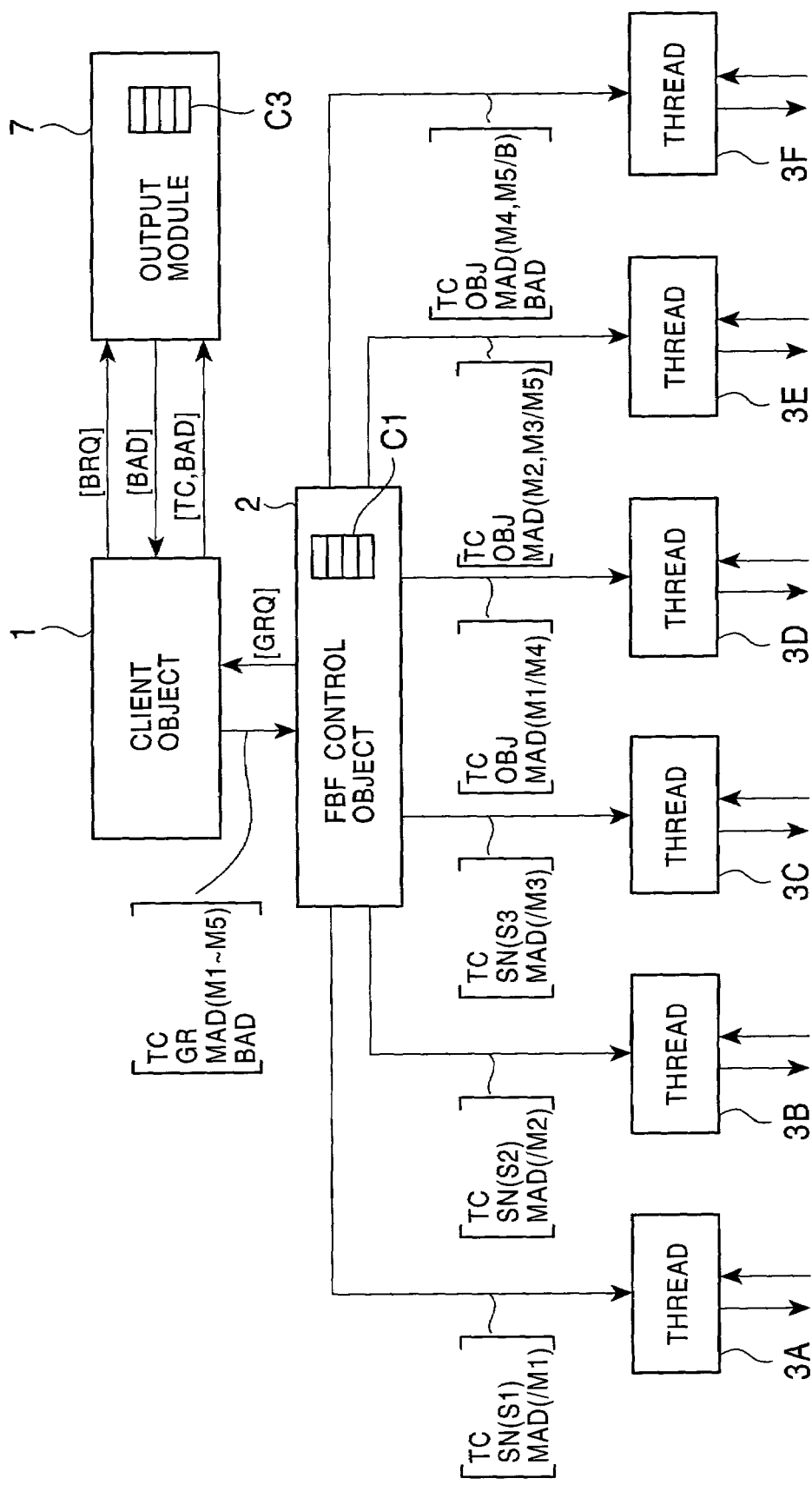
FIG. 7 is a flowchart showing the flow of a specific example of the editing processing shown in FIG. 3 of a video editing program.

Next, the kind of processing the video editing program performs for achieving the editing processing shown as the specific examples in FIGS. 3 and 6 will be described in detail with reference to FIGS. 7 to 9. Here, FIGS. 7 to 9 show the processing flow shown in FIG. 2 in detail corresponding to the above-described specific example. FIGS. 8 and 9 show processing following the processing shown in FIG. 7.

First of all, the processing will be described with reference to FIG. 7. In this specific example, the client object 1 sends a buffer address request BRQ to the output module 7 requesting an address of the input/output buffer 115 where a frame which is completely processed is stored once. The output module 7 having received the buffer address request BRQ returns an appropriate buffer address BAD to the client address object 1.

Next, the client object 1 time-slices the editing chart, as shown, for example, in FIG. 10 sequentially in accordance with a time code TC from the left to the right (the direction of the time flow) on the time axis. Thus, the client object 1 creates dependency relationship graphs G as shown in FIGS. 12 to 16, for example. The client object 1 sends to the FBF control object 2 a message including, as parameters, the time code TC, the dependency relationship graph GR, the memory addresses M1 to M5 of the work memory 112B, and the buffer address BAD.

The FBF control object 2 queues in the queue C1 the dependency graph G sent from the client object 1 one after another and further searches in the queued dependency relationship graphs. Then, the FBF control object 2 selects one or a plurality of types of processing which satisfy the dependency relationship (that is, executable in time and in order) and passes a message including parameters required for each type of processing to threads 3A to 3F responsible for the type of processing. The parameters passed to each thread are as follows:

The parameters included in a message passed to the thread 3A responsible for reading out a frame of the source S1 from the disk device 30 are a time code TC, a source identifier SN (S1, here), and memory addresses MAD (/M1, here) indicating the place where the processing results are stored. Here, the notation "/M1" having "M1" after the slash "/" indicates that the storage memory is M1. The notation will be used below in the same manner.

The parameters included in the message passed to the thread 3B responsible for reading out a frame of the source S2 from the disk device 30 are a time code TC, a source identifier SN (S2, here), and a memory address MAD (/M2, here).

The parameters included in the messages passed to the thread 3C responsible for reading out frames of the source S3 from the disk device 30 are a time code TC, a source identifier SN (S3, here), and a memory address MAD (/M3).

The parameters included in the message passed to the thread 3D responsible for the luminance conversion effect are a time code TC, an object code OBJ indicating an object for executing the processing, and memory addresses MAD (M1/M4, here) indicating a place where processing objects and processing results are stored. The object code OBJ here specifies a hardware image conversion object 5B. The notation "M1/M4", in which M1 and M4 are separated by a slash "/", indicates that a memory where processing objects are stored is M1 and a memory for storing processing results is M4.

The parameters included in the message passed to the thread 3E responsible for the wipe effect are a time code TC, an object code OBJ indicating an object for executing the processing, and memory addresses MAD indicating a place for storing processing objects and processing results (M2, M3/M5, here). The object code OBJ here specifies a software image conversion object 5C. The notation "M2, M3/M5" indicates that memories where the targets to be stored are M2 and M3 and a memory for storing processing results is M5.

The parameters included in the message passed to the thread 3F responsible for the layering processing are a time code TC, an object code OBJ indicating an object for executing the layering processing, memory addresses MAD indicating a place for storing processing objects and processing results (M4, M5/B, here), and a buffer address BAD. The object code OBJ here specifies a software image conversion object 5D for executing the layering processing. The notation "M4, M5/B" indicates that memories where the targets to be stored are M4 and M5 and the input/output buffer 115 is the place where the processing result is stored. A buffer address of the storage place in this case is indicated by a buffer address BAD.

Next, further description will be given with reference to FIG. 8.

The thread 3A having received a time code TC, a source identifier SN (S1), and a memory address MAD (/M1) from the FBF control object 2 passes a message including a time code TC, and a memory address MAD (/M1) where a read frame is stored to the medium abstraction object 4A responsible for the source S1.

The thread 3B having received a time code TC, a source identifier SN (S2), and a memory address MAD (/M2) from the FBF control object 2 passes a message including a time code TC, and a memory address MAD (/M2) where a read frame is stored to the medium abstraction object 4B responsible for the source S2.

The thread 3C having received a time code TC, a source identifier SN (S2), and a memory address MAD (/M3) from the FBF control object 2 passes a message including a time code TC, and a memory address MAD (/M2) where a read frame is stored to the medium abstraction object 4C responsible for the source S3.

The medium abstraction object 4A having received a message from the thread 3A converts the time code TC included in the message to a frame address FAD indicating a recorded location on a disk and passes to the disk read-out object 5A the frame address FAD and the memory address (/M1) for storing processing results. Here, the thread 3A passes to the disk read-out object 5A an event unprocessed flag EVT0 indicating "unprocessed" along with the above-described parameter.

The medium abstraction object 4B having received a message from the thread 3B converts the time code TC included in the message to a frame address FAD and passes to the disk read-out object 5A the frame address FAD and the memory address (/M2) for storing processing results. Here, the thread 3B passes to the disk read-out object 5A an event unprocessed flag EVT0 along with the above-described parameter.

The medium abstraction object 4C having received a message from the thread 3C converts the time code TC included in the message to a frame address FAD and passes to the disk read-out object 5A the frame address FAD and the memory address (/M3) for storing processing results. Here, the thread 3C passes to the disk read-out object 5A an event unprocessed flag EVT0 along with the above-described parameter.

The disk read-out object 5A having received the messages from the medium abstraction objects 4A, 4B, and 4C queues these messages in the queue C2. The disk read-out object 5A searches sequential frames, as video, from a plurality of frames indicated by the plurality of queued messages, respectively. Then, the disk read-out object 5A reads out these sequential frames together from a resource 6 (disk device 30, here) and writes them in the memory address (either one of M1 to M3) specified by the work memory 112B. Then, the disk read-out object 5A returns event completion flags EVT1 indicating that the processing is completed to the medium abstraction objects 4A, 4B, and 4C, respectively.

The medium abstraction objects 4A, 4B, and 4C having received the event completion flags, return event completion message DONE to the threads 3A to 3C, respectively. Thus, each of threads 3A to 3C realizes that reading out sequential frames from the disk device 30 to the work memory 112B has been completed. In this way, by taking a method of reading out sequential frames after queuing, the performance of the disk device 30, which is slower than other resources, can be kept fast.

Next, the following description is given with reference to FIG. 9.

The thread 3D having received the time code TC, the object code OBJ, and the memory address MAD (M1/M4) from the FBF control object 2 (FIG. 7) passes a message including these parameters to the effect abstraction object 4D for luminance conversion processing. The thread 3E having received the time code TC, the object code OBJ, and the memory address MAD (M2, M3/M5) from the FBF control object 2 passes a message including these parameter to the effect abstraction object 4E for the wipe processing. The thread 3F having received the time code TC, the object code OBJ, and the memory address MAD (M4, M5/B) from the FBF control object 2 passes these parameters to the effect abstraction object 4F for the layering processing.

The effect abstraction object 4D having received the message from the thread 3D passes the memory addresses (M1/M4) indicating places where processing objects and processing results are stored and an event unprocessed flag ETV0 to the hardware image conversion object 5B. The hardware image conversion object 5B reads out one frame from the memory M1 of the work memory 112B. Then, the hardware image conversion object 5B uses the resource 6 (image processing unit 16, here (FIG. 1)) to perform the luminance conversion effect on the read frame and stores the result in the memory M4 of the work memory 112B. Then, the disk readout object 5B returns an event completion flag ETV1 to the effect abstraction object 4D.

The effect abstraction object 4E having received the message from the thread 3E passes memory addresses (M2, M3/M5) indicating the places where processing objects and processing results are stored to the software image conversion object 5C. The software image conversion object 5C reads out one frame from each of the memories M2 and M3 of the work memory 112B. The software image conversion object 5C uses the resource 6 (CPU itself, here) to perform the wipe processing in software by using the read frame and stores the result in the memory M5 of the work memory 112B. Then, the software image conversion object 5C returns a processing completion message (DONE) to the effect abstraction object 4E.

The effect abstraction object 4F having received the message from the thread 3F passes memory addresses (M4, M5/M6) indicating the places where processing objects and processing results are stored to the software image conversion object 5D. The software image conversion object 5D reads out one frame from each of the memories M4 and M5 of the work memory 112B. The software image conversion object 5D uses the resource 6 (CPU itself, here) to compose two read frames in software and stores the result in the buffer address BAD of the input/output buffer 115. Then, the software image conversion object 5D returns a processing completion message (DONE) to the effect abstraction object 4F. In this way, frames on which all types of editing processing have been performed are stored sequentially in the input/output buffer 115.

The event unprocessed flag EVT0 and the event completion flag ETV1 are used for recognizing the completion of the processing between the medium abstraction objects 4A, 4B, and 4C and the disk read-out object 5A, and between the effect abstraction object 4D and the hardware image conversion object 5B. This is because processing is performed by using hardware during those times. That is, within the hardware, processing is performed asynchronously with processes (programs), and the processes and hardware have to be synchronized. Therefore, the event unprocessed flag EVT0 and the event completion flag EVT1 are needed as a flag is the synchronization. On the other hand, the exchange of flags is not necessary between the effect abstraction objects 4E and 4F and the software image conversion objects 5C and 5D. In this case, the processing is performed in software, and the subject for execution is the CPU itself. Therefore, only returning the completion message (DONE) is enough.

The effect abstraction object 4D having received the event completion flag EVT1 from the hardware image conversion object 5B returns a processing completion message (DONE) to the thread 3D. Further, the effect abstraction objects 4E and 4F having received a completion message (DONE) from the software image conversion objects 5C and 5D returns the processing completion messages (DONE) to the threads 3E and 3F, respectively. Thus, the threads 3D to 3F recognize that each image conversion processing is completed. After that, each thread acknowledges to the client object 1 through the FBF control object 2 that one thread processing has been completed.

As shown in FIG. 7, the client object 1 passes a message including a time code TC and a buffer address BAD as parameters to the output module 7 each time processing for one frame is completed. The output module 7 queues the message received from the client object 1 in the queue C3. When a predetermined number of messages are stored in the input/output buffer 115, the output module 7 outputs frames stored in the input/output buffer 115 in a predetermined order and in synchronization with the output clock (not shown). Here, the order of the frame output is determined based on a value of time codes TC corresponding to frames. More specifically, the output module 7 reads out and outputs frames from the buffer address BAD on the input/output buffer 115 corresponding to the time code TC in order from the smallest value of the time code TC. In this way, the edited video is output from the input/output buffer 115 in real time and displayed on the display device 40. A user can recognize the edited result by looking at the video.

As described above, according to the video editing system of this embodiment, memories are interposed before and after each effect processing. Thus, the client object 1 can request the processing without knowing whether hardware or software is used for performing the effect processing. Therefore, a video editing system having the mixture of hardware and software can be established easily, which allows a change of order of the internal processing and/or the extension of functions (plug-in function, for example) in a flexible manner. It should be noted that the plug-in function here refers to the incorporation of a function to the editing program and is an extension function enabling processing which could not be performed only by using the functions of the original editing program.

Further, according to this embodiment, a plurality of different frame processing including the readout of frames from the disk and effect processing on frames are performed by using the multi-threading method in parallel. Thus, the average time required for one frame processing can be reduced, which allows the reduction of the overall processing time of the editing processing.

Still further, according to this embodiment, the frame processing is performed in frames and in a non-realtime and asynchronous manner, and the processing results are buffered and output continuously. Therefore, edited video can be output in realtime without any interruption. Also, even when any differences exist between the time required for frame processing by hardware and the time required for frame processing by software, the time difference is absorbed by buffering at the final stage. In this respect, the co-existence of hardware and software becomes easier.

Furthermore, according to this embodiment, dependency relationship graphs are created based on an editing chart which indicates the dependency relationship between the kind of frame processing that should be performed with respect to each video frame and each frame processing. Then, individual frame processing is performed based on the dependency relationship graphs. Therefore, irrespective of how complicated the editing processing is, it can be resolved into the small units of frame processing in order to achieve parallel processing uniformly.

According to this embodiment, a plurality of dependency relationship graphs are stored first. Then, executable frame processing is selected from the plurality of stored dependency relationship graphs in order to execute the selected frame processing. Thus, it nearly eliminates a situation in which one frame processing waits for completion of another frame processing, which permits smooth parallel processing. Also in this respect, the reduction of the time required for editing processing can be achieved.

In this way, the video editing method according to this embodiment provides a realtime processing model, which overcomes problems suffered by each of the conventional streaming processing and frame-by-frame processing methods. Thus, the video editing method according to this embodiment can be regarded as the above-described "super real-time processing method" in the sense that it transcends the conventional realtime processing.

The present invention has been described with reference to the embodiment above. However, the present invention is not limited to the embodiment, and various modifications are possible. For example, the above-described embodiment has been described with reference the specific example of editing processing as shown in FIG. 3. However, the present invention is not limited thereto and can address other various editing processing patterns flexibly. For example, in the above-described specific example, as special effect processing for video editing, luminance conversion processing, wipe processing and layering processing have been given as examples. However, the present invention is additionally applicable to cases where fade-in/fade-out processing, mosaic processing, and/or other arbitrary special effect processing are performed.

Further, in the specific example in the above-described embodiment, the luminance conversion effect processing is performed by using hardware while the wipe effect and layering processing are performed by using software. However, the wipe effect or layering processing may be performed by using hardware. Of course, all of them may be processed by using hardware or software only.

Also, in the above-described embodiment, a hard disk device is used as the disk device 30 that is a storage device permitting non-linear access (random access). However, other devices such as disk-type storage media like a magneto optical disk or a digital versatile disk (DVD), or even a semiconductor storage medium may be used.

Further, in the above-described embodiment, memories M1 to M5 interposed between one frame processing and other frame processing are physically allocated within the single work memory 112B. However, the present invention is not limited thereto. For example, a plurality of work memories may be prepared physically for use as memories M1 to M5, respectively, for example.

Furthermore, in this embodiment, a CD-ROM is used for a computer readable recording medium on which a video editing program is recorded. However, the present invention is not limited thereto, and any other storage media may be used. A wide variety of portable storage media may be used such as a CD-R (rewritable), a CD-RAM, a DVD-ROM, a DVD-RAM, a magnetic tape, a floppy disk, removable hard disk, or a semiconductor memory device.

Still further, in this embodiment, the video editing program is introduced to the video editing device through a portable storage medium as described above. However, the present invention is not limited thereto. The video editing programs may be obtained through the LAN 60 (FIG. 1) or a communication medium such as the Internet (not shown) in order to install it in the built-in disk device 19 of the editing device main unit 10.

What is claimed is:

1. A video editing device for use with a computer readable recording and playing device operable to allow video material recording and playback and to allow non-linear editing of the video material, comprising:
   frame processing means for retrieving a video frame that is a basic construction unit of the video material from said recording and playing device which stores video material to be edited, and for performing frame processing on the retrieved video frame; wherein said frame processing means comprises:
      at least one image processing means for performing predetermined image processing on individual video frames;
      first storage means interposed between said recording and playing device and said frame processing means; and
      second storage means interposed between each of a plurality of said frame processing means;
   control means for controlling said frame processing means such that at least two types of frame processing by said frame processing means are performed upon the retrieved video frame in parallel,
   wherein controlling is performed by storing, in order of input, a plurality of dependency relationship data, analyzing relationships among the plurality of dependency relationship data, and determining each type of frame processing to be executed as a function of the relationships among the plurality of dependency data;
   frame storage means for storing a plurality of video frames after said frame processing means completes all frame processing frame-by-frame upon the plurality of video frames, and for sequentially outputting the plurality of video frames, wherein said first storage means, said second storage means and said frame storage means are physically different; and
   an output module that receives, from an image conversion object, a buffer address indicating where the retrieved video frame is stored and a corresponding time code;
   whereby the video frames are output from said frame storage means in real-time.

2. The video editing device according to claim 1 wherein said control means causes frame processing by said frame processing means to be performed in a non-real-time manner.

3. The video editing device according to claim 1, wherein said control means
   controls said recording and playing device, said first and second storage means, and each of the frame processing means such that at least two types of processing of video frames between
      said recording and playing device,
      said first storage means,
      said second storage means, and
      image processing on video frames in each of said image processing means are performed in parallel, and
   further controls said frame storage means such that the plurality of video frames, stored in said frame storage means in no special order, are output in a predetermined order.

4. The video editing device according to claim 1, further comprising:
   input means for inputting an editing schedule along a time axis;
   with said control means creating processing management data representing a dependency relationship between the kind of frame processing performed on each video frame and each frame processing based on the editing schedule input through said input means, and
   controlling said frame processing means operable to be executed based on said processing management data.

5. The video editing device according to claim 4, wherein said control means
   stores a plurality of said created processing management data;
   selects executable frame processing from said plurality of stored processing management data; and
   controls said frame processing means in order to execute said selected frame processing.

6. The video editing device according to claim 5, wherein said control means
   defers execution of readout processing when said selected executable frame processing is processing for reading out a video frame from said recording and playing device, and
   selects a plurality of sequential video frames from video frames to be read out at the time when a plurality of said deferred-execution read-out processing are gathered and then reading out the plurality of selected video frames from said recording and playing device for storage in said first storage means.

7. The video editing device according to claim 3, said image processing means comprising:
- a first image processing portion constructed by hardware; and
- a second image processing portion constructed by software.

8. A video editing method for using a computer readable recording and playing device to allow video material recording and playback for performing non-linear editing on the video material, comprising the steps of:
- retrieving a video frame that is a basic construction unit of the video material from said recording and playing device which stores video material to be edited and for performing frame processing on said retrieved video frame;
- storing said video frames;
- said frame processing step comprises:
  - at least one image processing step for performing predetermined image processing on individual video frames;
  - a first writing step for writing video frames to a memory;
  - a first read-out step for reading out video frames from said memory and providing them to any of image processing steps;
  - a second writing step for writing video frames processed at said frame processing step and then writing them in said second memory; and
  - a second read-out step for reading out video frames from said second memory and providing the video frames in any of the image processing steps,
- controlling said frame processing such that at least two types of frame processing are performed upon the retrieved video frame in parallel,
- wherein controlling is performed by storing, in order of input, a plurality of dependency relationship data, analyzing relationships among the plurality of dependency relationship data, and determining each type of frame processing to be executed as a function of the relationships among the plurality of dependency data;
- storing a plurality of video frames after said frame processing means completes all frame processing frame-by-frame upon the plurality of video frames, wherein said memory and said second memory are physically different;
- receiving a buffer address indicating where the retrieved video frame is stored and a corresponding time code; and
- outputting sequentially said plurality of stored video frames in real-time.

9. The video editing method according to claim 8 wherein frame processing at said frame processing step is performed in a non-real-time manner.

10. The video editing method according to claim 8, wherein
at least two types of frame processing are performed at said first and second writing steps, said first and second read-out steps, and said image processing steps are performed in parallel, and the plurality of the video frames stored at said frame storage step in no special order are output in a predetermined order at said frame output step.

11. The video editing method according to claim 8, further comprising:
- an input step for inputting an editing schedule along a time axis; and
- a step for creating processing management data representing a dependency relationship between the kind of frame processing performed on each video frame and each frame processing based on the editing schedule input in said input step,
- wherein said frame processing step is executed based on said processing management data.

12. The video editing method according to claim 11, further comprising:
- a step for storing a plurality of said created processing management data; and
- a step for selecting executable frame processing from said plurality of stored management processing data, wherein said selected frame processing is executed at said frame processing step.

13. The video editing method according to claim 12, wherein said frame processing step comprises the steps of:
- deferring execution of readout processing when said selected executable frame processing is processing for reading out a video frame from said recording and playing device;
- selecting a plurality of sequential video frames from video frames to be read out at the time when a plurality of said deferred-execution read-out processing are gathered; and
- reading out the plurality of selected video frames from said recording and playing device.

14. The video editing method according to claim 10, wherein
said image processing step comprises performing image processing by using hardware; and
performing image processing by using software.

15. A video editing system for performing non-linear editing of video material, comprising:
- a computer readable recording and playing device operable to allow video material recording and playback;
- frame processing means for retrieving a video frame that is a construction unit of the video material from said recording and playing device, and for performing frame processing on the retrieved video frame wherein said frame processing means comprises:
  - at least one image processing means for performing predetermined image processing on individual video frames;
  - first storage means interposed between said recording and playing device and said frame processing means; and
  - second storage means interposed between each of a plurality of said frame processing means;
- control means for controlling said frame processing means such that at least two types of frame processing by said frame processing means are performed upon the retrieved video frame in parallel,
- wherein controlling is performed by storing, in order of input, a plurality of dependency relationship data, analyzing relationships among the plurality of dependency relationship data, and determining each type of frame processing to be executed as a function of the relationships among the plurality of dependency data;
- frame storage means for storing a plurality of video frames after said frame processing means completes all frame processing frame-by-frame upon the plurality of video frames, and for sequentially outputting the plurality of video frames, wherein said first storage means, said second storage means and said frame storage means are physically different; and an output module that receives, from an image conversion object, a buffer address indicating where the retrieved video frame is stored and a corresponding time code;

wherein video frames are output from said frame storage means in real-time.

16. A video editing method for editing source video data recorded on a computer readable recording medium, comprising the steps of:

playing said source video data in frames and performing frame processing on said played frame video data;

first and second storage means for storing the video frames;

said frame processing step comprises:

at least one image processing step for performing predetermined image processing on individual video frames;

a first writing step for reading out video frames from said recording and playing device and then writing them in said first storage means;

a first read-out step for reading out video frames from said first storage means and then providing them to any of image processing steps;

a second writing step for reading out video frames processed at said frame processing step and then writing them in said second storage means; and a second read-out step for reading out video frames from said second storage means and then providing them in any of the image processing steps, storing the frame video data on which said frame processing is completely performed and outputting said stored frame video data as output video data, wherein said first storage means and said second storage means are physically different, receiving a buffer address indicating where the frame video data is stored and a corresponding time code; and controlling said frame processing such that each frame of said output video data is real-time video data, wherein controlling is performed by storing, in order of input, a plurality of dependency relationship data, analyzing relationships among the plurality of dependency relationship data, and determining each type of frame processing to be executed as a function of the relationships among the plurality of dependency data;

wherein at least two types of frame processing are performed in parallel on a frame-by-frame basis upon a single played video frame.

* * * * *